US011137261B2

(12) United States Patent
Beaurepaire et al.

(10) Patent No.: US 11,137,261 B2
(45) Date of Patent: Oct. 5, 2021

(54) METHOD AND APPARATUS FOR DETERMINING AND PRESENTING A SPATIAL-TEMPORAL MOBILITY PATTERN OF A VEHICLE WITH RESPECT TO A USER BASED ON USER APPOINTMENTS

(71) Applicant: HERE GLOBAL B.V., Eindhoven (NL)

(72) Inventors: Jerome Beaurepaire, Berlin (DE); Sven Krome, Berlin (DE)

(73) Assignee: HERE Global B.V., Eindhoven (NL)

( * ) Notice: Subject to any disclaimer, the term of this patent is extended or adjusted under 35 U.S.C. 154(b) by 0 days.

(21) Appl. No.: 16/191,111

(22) Filed: Nov. 14, 2018

(65) Prior Publication Data
US 2020/0149909 A1     May 14, 2020

(51) Int. Cl.
    *G01C 21/34*     (2006.01)
    *G01C 21/36*     (2006.01)
    *G06Q 10/10*     (2012.01)

(52) U.S. Cl.
    CPC ..... *G01C 21/3484* (2013.01); *G01C 21/3697* (2013.01); *G06Q 10/1095* (2013.01)

(58) Field of Classification Search
    CPC ............... G01C 21/3484; G01C 21/3697
    See application file for complete search history.

(56) References Cited

U.S. PATENT DOCUMENTS

| | | | | |
|---|---|---|---|---|
| 2010/0262362 | A1* | 10/2010 | Naito | G08G 1/096866 701/424 |
| 2015/0185034 | A1* | 7/2015 | Abhyanker | G06Q 50/01 701/23 |
| 2015/0338852 | A1* | 11/2015 | Ramanujam | G01C 21/26 701/2 |
| 2015/0346727 | A1* | 12/2015 | Ramanujam | B62D 15/0285 701/23 |
| 2017/0089711 | A1* | 3/2017 | Bae | G01C 21/3484 |
| 2017/0146991 | A1 | 5/2017 | Parekh et al. | |
| 2017/0234687 | A1* | 8/2017 | Tseng | G01C 21/34 701/461 |
| 2018/0060827 | A1 | 3/2018 | Abbas et al. | |
| 2018/0283896 | A1* | 10/2018 | Piemonte | G01C 21/3664 |
| 2019/0311014 | A1* | 10/2019 | Sugawara | G01C 21/36 |
| 2020/0175432 | A1* | 6/2020 | Iwasaki | G05D 1/0212 |

FOREIGN PATENT DOCUMENTS

WO     2017053359 A1     3/2017

OTHER PUBLICATIONS

Office Action for related European Patent Application No. 19206175.2-1222, dated Feb. 18, 2020, 7 pages.
Office Action for related European Patent Application No. 19 206 175.5-1222, dated Apr. 9, 2021, 5 pages.

* cited by examiner

*Primary Examiner* — Anne Marie Antonucci
*Assistant Examiner* — Abdalla A Khaled
(74) *Attorney, Agent, or Firm* — Ditthavong, Steiner & Mlotkowski

(57) ABSTRACT

An approach is provided for determining and presenting a spatial-temporal mobility pattern of a vehicle with respect to a user based on user appointments. A routing platform identifies a user of a vehicle, one or more appointments of the user, or a combination thereof. The routing platform determines a spatial-temporal mobility pattern of the vehicle with respect to the user based on one or more locations, one or more scheduling times, and one or more context, or a combination thereof of the one or more appointments.

20 Claims, 24 Drawing Sheets

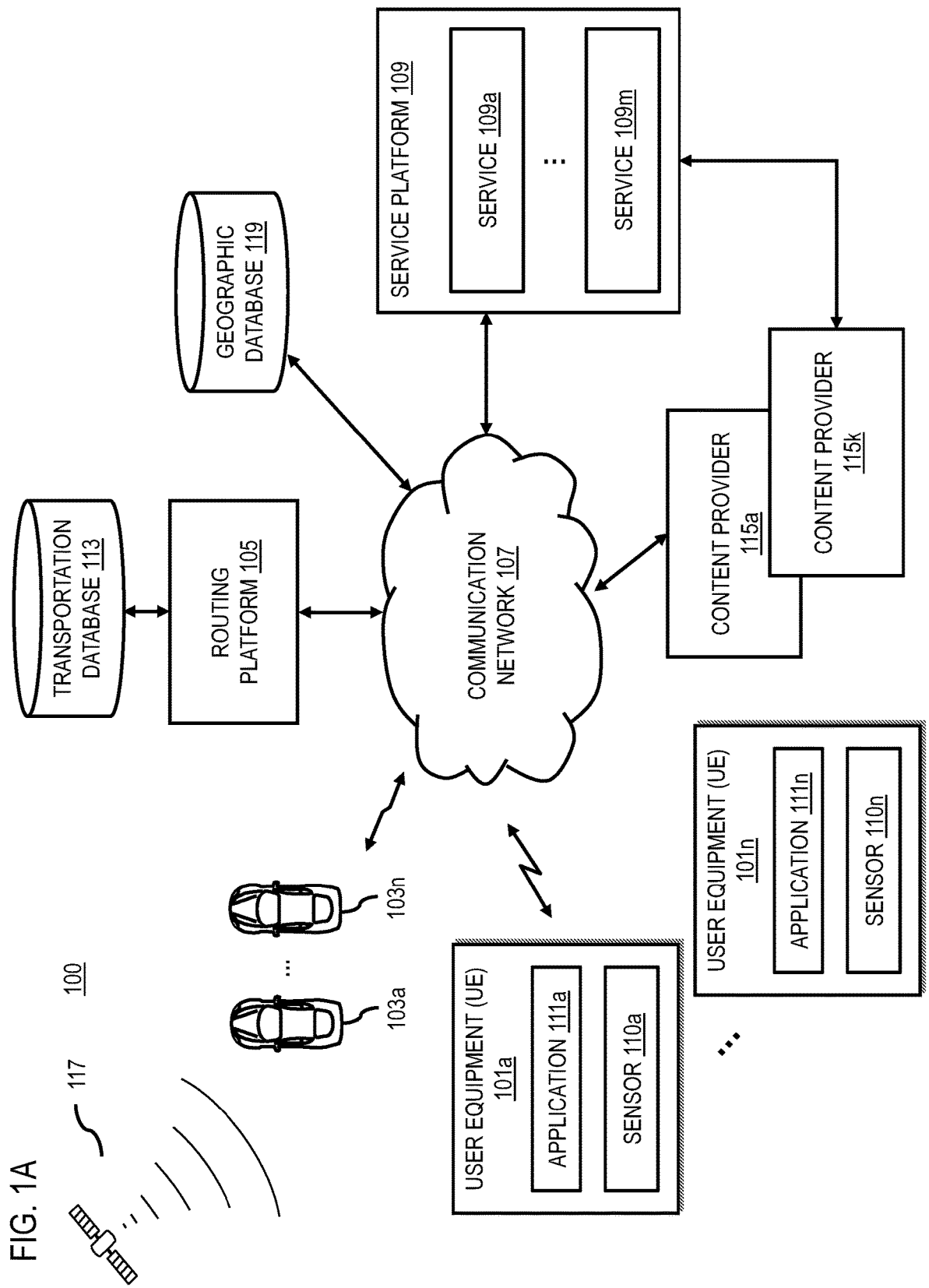

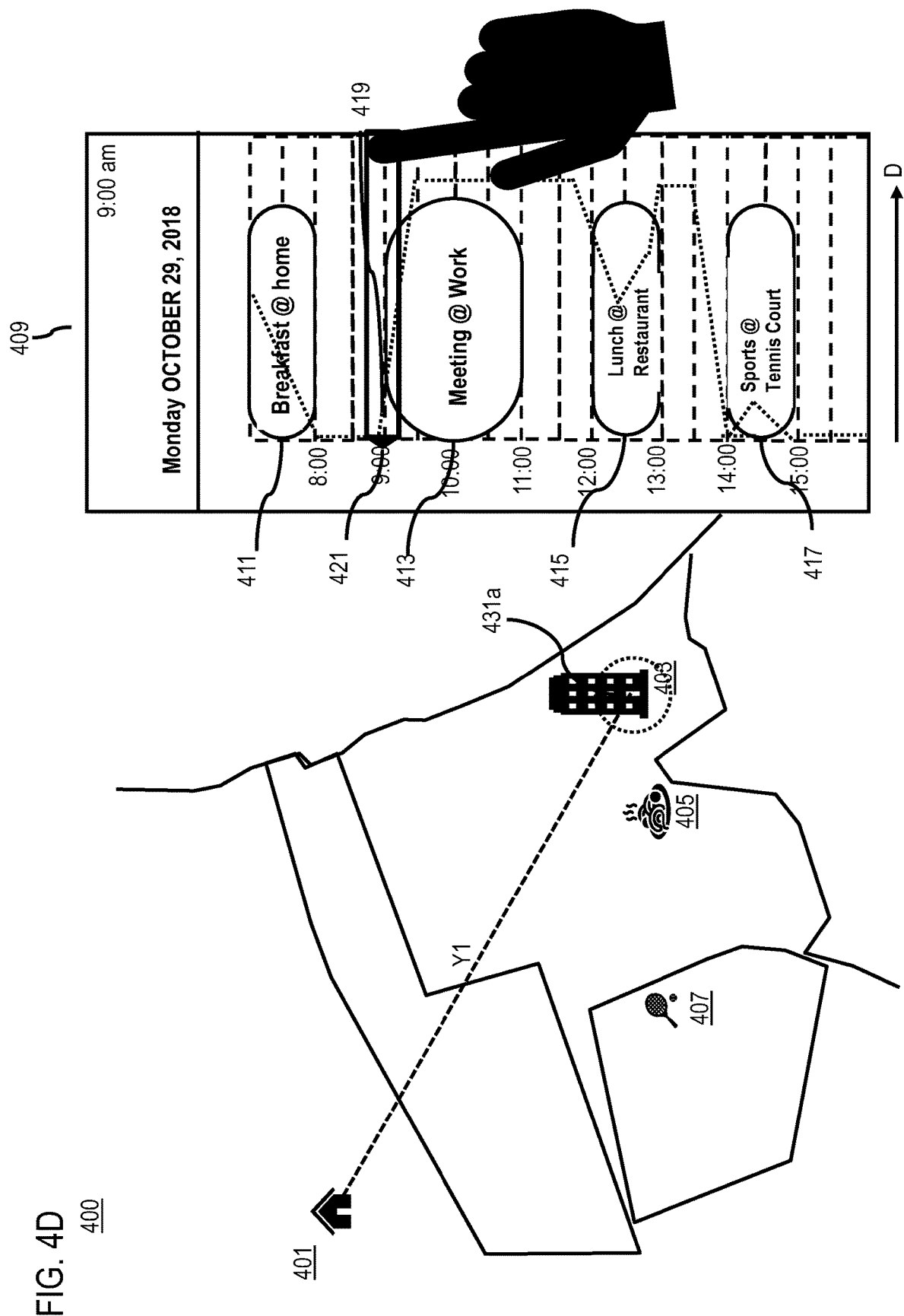

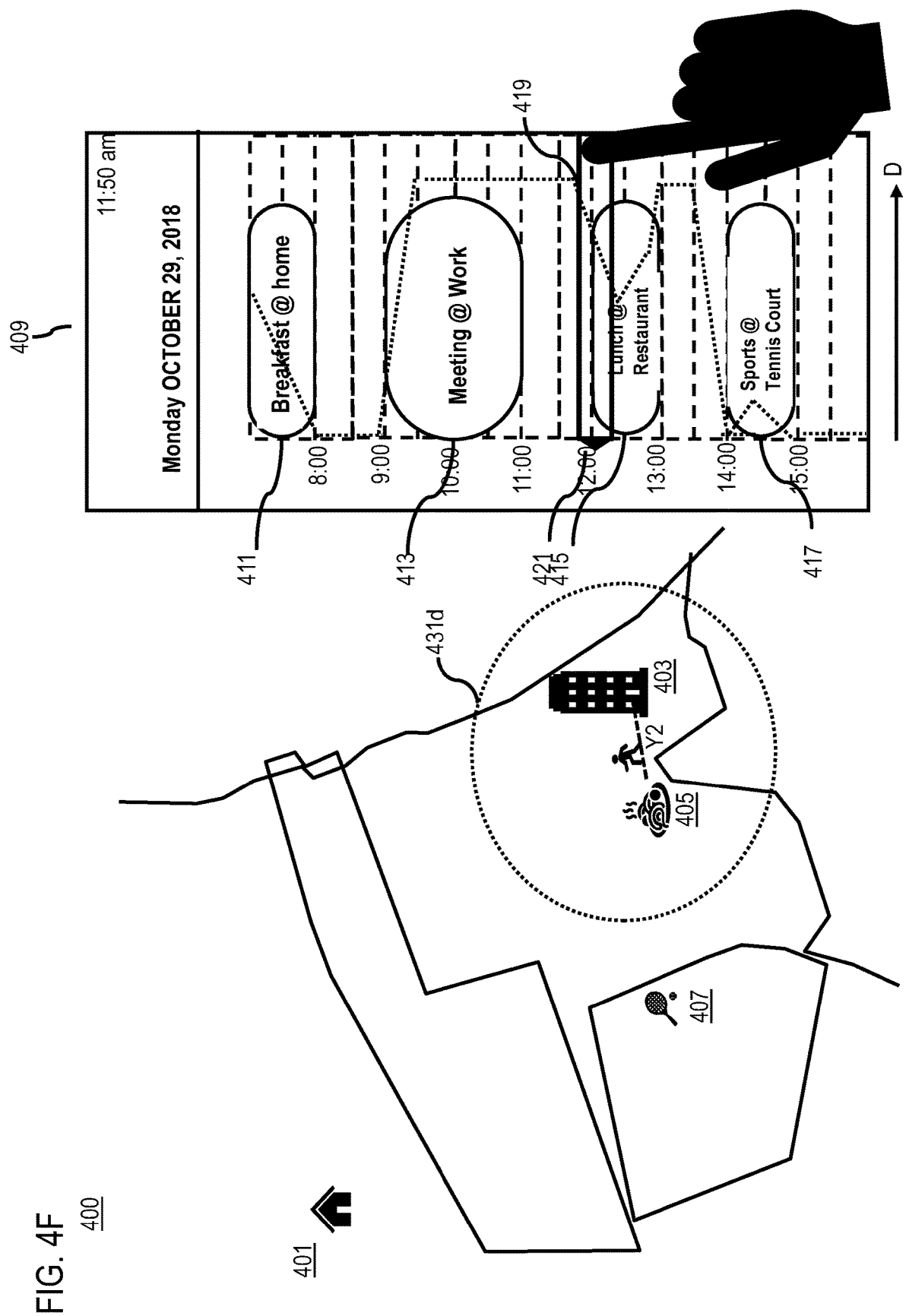

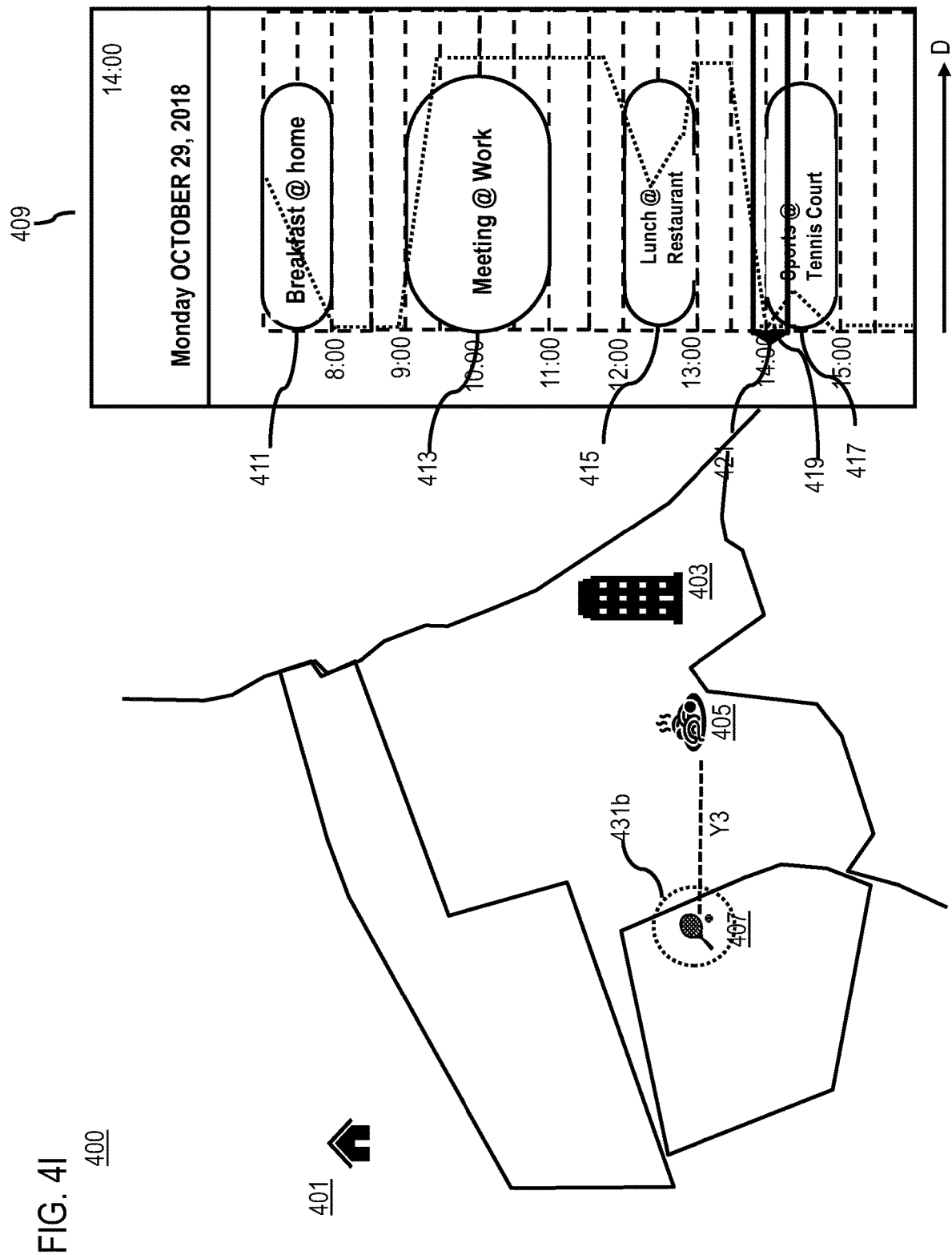

METHOD AND APPARATUS FOR DETERMINING AND PRESENTING A SPATIAL-TEMPORAL MOBILITY PATTERN OF A VEHICLE WITH RESPECT TO A USER BASED ON USER APPOINTMENTS

BACKGROUND

Service providers and automobile manufacturers are continually challenged to deliver value and convenience to consumers by, for example, providing compelling services. One area of interest has been the development of location-based services to that involve presenting real-time location of a vehicle to its user on a map user interface, and separately indicating the time frames when the user will need the vehicle in a calendar user interface. For example, in some scenarios, when the vehicle is an autonomous vehicle (e.g., a car, a motorcycle, etc.), there is a risk that the vehicle can be too far away from the user to ride to the next appointment. Under this type of scenario, service providers face significant technical challenges to optimizing the allocation of autonomous vehicles, considering mobility of the vehicles and appointment-related constraints, to satisfy the user's transportation needs.

SOME EXAMPLE EMBODIMENTS

Therefore, there is a need for an approach for determining and presenting a spatial-temporal mobility pattern of a vehicle with respect to a user based on user appointments. The spatial-temporal mobility pattern provides an overview of the user's day and the vehicle's proximity to the user during the day.

According to one embodiment, a method comprises identifying a user of a vehicle, one or more appointments of the user, or a combination thereof. The method also comprises determining a spatial-temporal mobility pattern of the vehicle with respect to the user based on one or more locations, one or more scheduling times, and one or more context, or a combination thereof of the one or more appointments.

According to another embodiment, an apparatus comprises at least one processor, and at least one memory including computer program code for one or more computer programs, the at least one memory and the computer program code configured to, with the at least one processor, identify a user of a vehicle, one or more appointments of the user, or a combination thereof. The apparatus is also caused to determine a spatial-temporal mobility pattern of the vehicle with respect to the user based on one or more locations, one or more scheduling times, and one or more context, or a combination thereof of the one or more appointments.

According to another embodiment, a computer-readable storage medium carries one or more sequences of one or more instructions which, when executed by one or more processors, cause, at least in part, an apparatus to identify a user of a vehicle, one or more appointments of the user, or a combination thereof. The apparatus is also caused to determine a spatial-temporal mobility pattern of the vehicle with respect to the user based on one or more locations, one or more scheduling times, and one or more context, or a combination thereof of the one or more appointments.

According to another embodiment, an apparatus comprises means of identifying a user of a vehicle, one or more appointments of the user, or a combination thereof. The apparatus also comprises means for determining a spatial-temporal mobility pattern of the vehicle with respect to the user based on one or more locations, one or more scheduling times, and one or more context, or a combination thereof of the one or more appointments.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 1A is a diagram of a system for determining and presenting a spatial-temporal mobility pattern of a vehicle with respect to a user based on user appointments, according to one embodiment;

FIGS. 4A-4J are diagrams of a user interface used in the processes for presenting a daily spatial-temporal mobility pattern of a vehicle with respect to a user based on user appointments, according to various embodiments;

DESCRIPTION OF SOME EMBODIMENTS

Figure 1B:
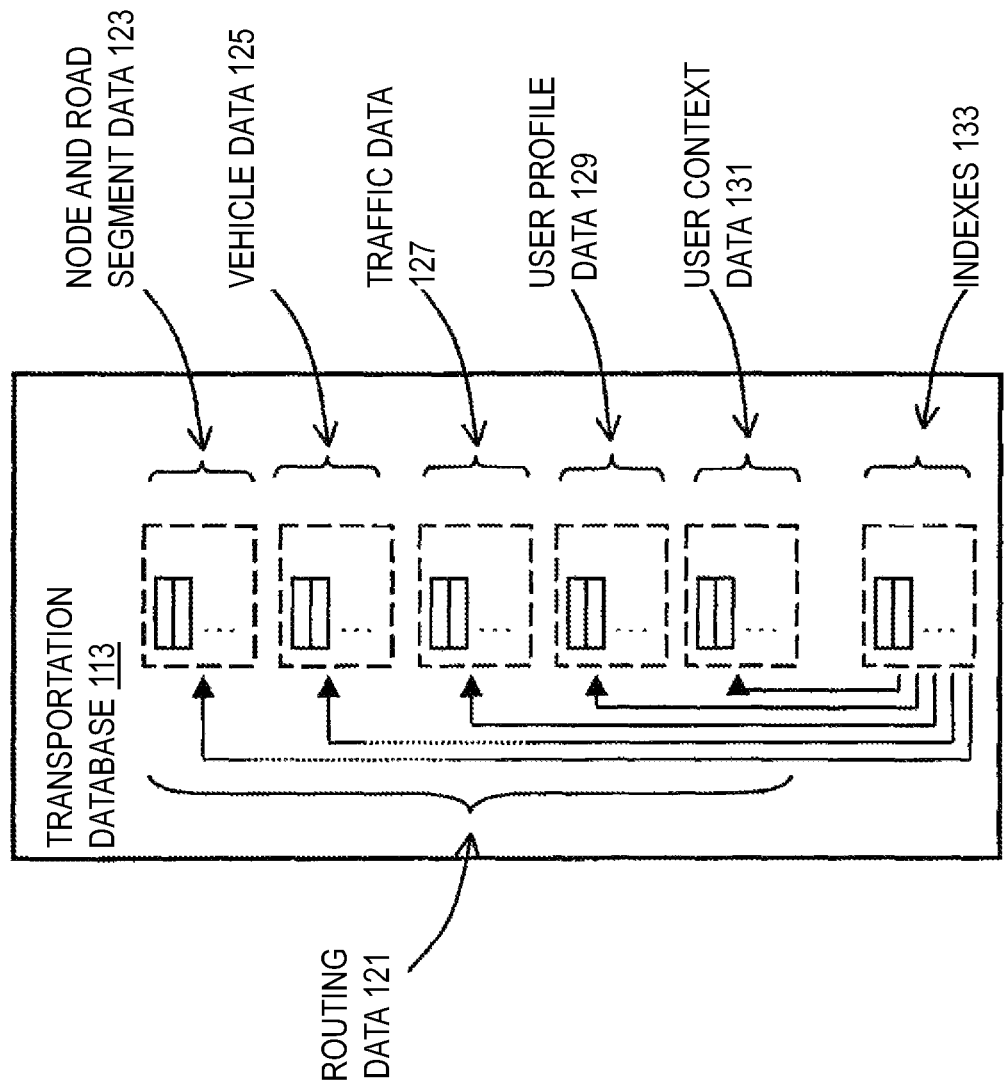
FIG. 1B is a diagram of a transportation database, according to one embodiment.

Examples of a method, apparatus, and computer program for determining and presenting a spatial-temporal mobility pattern of a vehicle with respect to a user based on user appointments are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

FIG. 1A is a diagram of a system for determining and presenting a spatial-temporal mobility pattern of a vehicle with respect to a user based on user appointments, according to one embodiment. As autonomous vehicles increase, the task of ensuring the vehicle will be available whenever the user needs it becomes complex. For example, the autonomous vehicle can park itself at a further away yet free or cheaper parking spot. As another example, the autonomous vehicle can drive itself to pick up another family member or run some errands (e.g., picking up dry-cleaning, etc.) for the user in-between the first user's appointments. Therefore, there is a need to properly manage the mobility of autonomous vehicle with respect to the user's appointments and emerging needs accompanying the increasing popularity of autonomous vehicles.

In some cases, the vehicle is a shared vehicle that is scheduled to pick up related users (e.g., family members, friends, contacts, etc.) at different locations, thereby adding additional complexity. Under this type of scenario, service providers face significant technical challenges to optimizing the allocation of the shared vehicle, considering proximity of the vehicle to the users' appointments, to satisfy all of the users' transportation needs.

To address these problems, a system 100 of FIG. 1A introduces a capability to efficiently create the next generation of routing services via determining and presenting a spatial-temporal mobility pattern of a vehicle with respect to a user based on user appointments. The spatial-temporal mobility pattern provides an overview of the user's day and the vehicle's proximity to the user during the day.

In cases of multiple users sharing one or more vehicles, the system 100 considers the transportation needs of all users, their mobility patterns, and generates an aggregated spatial-temporal mobility pattern of the vehicles with respect to the users based on all user appointments. The system 100 may use different colors and/or styles to code each user's appointments in one user interface shared by all the users. When the system 100 updates an aggregated spatial-temporal mobility pattern for one user, the update will be shown to all the users, in order to reflect the interdependencies between the users and the vehicles. The system 100 alerts the users as soon as it detects that one trip is not possible any more based on some factor changes. For example, if one family member needs to go to an emergency room, taking the primary user to the next appointment by the vehicle may be infeasible. The system 100 then recommends alternative transport modes for the primary user.

To simplify the discussion, one user uses one vehicle is taken as the main example, while the approaches are applicable to multiple users share one or more vehicles. A vehicle may be semi-autonomous or autonomous, such as a car, a motorcycle, an electric bike, an electric scooter, a bicycle, a boat, a shuttle, a van, a bus, a helicopter, an airplane, etc.

In one embodiment, the user owns an autonomous vehicle which operates autonomously to meet up with the user and travel to the user's appointments. In another embodiment, the vehicle is owned by an individual (e.g., a contact of the user, a stranger to the user, etc.), a group of individuals (e.g., a family), a business entity, a public entity, or an ad hoc grouping, to meet up with the user and travel to the user's appointments. These embodiments are applicable to vehicle rental, centralized ride-sharing, peer-to-peer ride-sharing, car-pooling, etc.

In one embodiment, the system 100 can parse the user's appointments and the relevant transportation needs from one or more online data sources, one or more offline data sources, or a combination thereof associated with the user. For example, the system 100 extracts and/or predicts the user's appointments and the relevant transportation needs based on the user profile, user context, current and/or historical user appointment data (e.g., an entry in the user's calendar, a social media event accepted or signed up by the user, an event in the user's message such as email, text message, instant message, SMS message, MMS message, etc.), current and/or historical vehicle data (e.g., user travel patterns/habits), etc. The system 100 then presents the extracted and/or predicted user transportation needs in a calendar-based view depicting calendar entries of the user appointments, and/or a map-based view depicting the locations of the user appointments on a user interface.

In some embodiments, the system 100 present the user transportation needs as a spatial-temporal mobility pattern of the vehicle with respect to the user based on locations, scheduling times, and context, or a combination thereof of the user appointments in a calendar-based view and/or a map-based view. Such spatial-temporal mobility pattern shows a timeline of the vehicle proximity (i.e., a physical distance) to the user during a time frame, such as a morning, a afternoon, a day, a week, a month, a season, a year, etc. The user can control the vehicle's proximity to the user by manipulating the spatial-temporal mobility pattern in a calendar view or a map view, while the manipulating in one view will be reflected in the other view by the system 100.

The system 100 allows the user to interact with the user interface via typing, touching, rotating, shaking, speaking to, etc. a user device embodied the user interface, to manipulate the spatial-temporal mobility pattern, the calendar-based view, and/or the map-based view, to update the user appointments and/or the spatial-temporal mobility pattern.

In another embodiment, the system 100 detects and/or predict, via real-time sensor data, and other real-time context data including user context data (e.g., an emergency room visit by the user), vehicle context data (e.g., an car accident involving the vehicle), environmental context data (e.g., traffic, weather, etc. impacting the vehicle), etc., an update to the user appointments (e.g., expediting, postponing, or canceling an appointment, changing a location of other context of an appointment, adding a new appointment, etc.), and modifies the spatial-temporal mobility pattern based on the update. For example, when a meeting ends earlier than planned, the system 100 adjusts the vehicle's distance/free travel zone to come closer.

In one embodiment, the system 100 includes one or more processes for automatically determining when and where a user may need the vehicle to travel to the next appointment, and an online service collecting routing information and providing guidance to the user to reach a vehicle meetup location (e.g., the drop off location of the last appointment, a location close to the drop off location if the drop off location is blocked or congested, a new location where the user walks, jogs, or using other transport modes to get to, etc.), generated according to the embodiments described herein. In one embodiment, the system 100 receives a user request to explicitly meet the vehicle at a particular location to travel to the next appointment.

In one embodiment, the vehicle requests a route to the next appointment such that one possible candidate route or the best calculated route (e.g., route taking the least amount of travel time and/or distance) is used to travel to the next appointment. In another embodiment, the system 100 detects a user travel pattern/habit and determines the optimal route to reach the next appointment. In one embodiment, the system 100 optimizes a user's travel time (or route or other routing cost function parameter such as distance, fuel efficiency, etc.) to the next appointment, using a routing cost function, dynamic (or real time) traffic monitoring and timing adjustments to get to the next appointment.

In one embodiment, UEs 101 of a user and sensors in a vehicle 103 are collecting and reporting data (e.g., location data) to the system 100 to support the determining and presenting a spatial-temporal mobility pattern of a vehicle with respect to a user based on user appointments according to the embodiments described herein. In this way, for instance, vehicles 103a-103n and/or vehicle users can use the system for sharing trajectory data and receiving vehicle supply and demand information as well as contextual data (e.g., traffic, weather conditions, etc.) that can be used to dynamically update the user meetup locations to determine the route that optimizes or reduces the amount of cost, time, distance, etc. to the next appointment. With this data along with other data such as but not limited to traffic information, the system 100 (e.g., a routing platform 105) can determine and present a spatial-temporal mobility pattern of a vehicle with respect to a user based on user appointments, and compute route options to the next appointment. The system 100 can determine traffic delays and make dynamic adjustment to the vehicle for meeting up with the user to ride to the next appointment. In one embodiment, the UEs 101 and the routing platform 105 have connectivity via a communication network 107.

In one embodiment, the vehicles 103a-103n are equipped with a device (e.g., the UE 101 or other accessory device) that records the vehicles' trajectory data (e.g., position, speed, etc.). In one embodiment, the UE 101 may be configured with one or more sensors 110a-110n (also collectively referred to as sensors 110) for determining the trajectory data (including parking locations). By way of example, the sensors 110 may include location sensors (e.g., GPS), accelerometers, compass sensors, gyroscopes, altimeters, etc.

In one embodiment, after a journey or the trajectory data is recorded (e.g., upon parking), the trajectory data is analyzed (e.g., by respective applications 111a-111n and/or the routing platform 105 for storage in, for instance, a transportation database 113 and/or a geographic database 119) to determine and present a spatial-temporal mobility pattern of a vehicle with respect to a user based on user appointments. Applications 111a-111n perform navigation, routing functions, and/or spatial-temporal mobility pattern functions independently or in conjunction with the routing platform 105. In one embodiment, the routing platform 105 and/or applications 111 receive a user request to explicitly determine and present a spatial-temporal mobility pattern of a vehicle with respect to a user based on user appointments.

In another embodiment, the user requests to meet with vehicle at a location different from the current location while sensor data reveals that the user is walking from the current location towards the different location.

In one embodiment, the system 100 detects a user travel pattern/habit using machine learning algorithms and predicts the user appoints and/or updates to the user appointments. In yet another embodiment, the system 100 detects user appointment updates based on an entry in the user's calendar (e.g., jogging), a social media event accepted or signed up by the user (e.g., a marathon race), an event in the user's message (e.g., email, text message, instant message, SMS message, MMS message, etc.).

In one embodiment, timestamp information indicates at which time and which location of a user appointment is recorded as a user context record in the transportation database 113. In one embodiment, the record is then transmitted or uploaded to the routing platform 105. In addition or alternatively, the user context data may be uploaded to the routing platform 105 to determine the user appointment record. In yet another embodiment, the user appointment record and/or trajectory data may be maintained at the UE 101 device for local processing to determine and present a spatial-temporal mobility pattern of a vehicle with respect to a user based on user appointments for transmission to the routing platform 105 and/or other vehicles/UEs 101 (e.g., when operating in a peer-to-peer network architecture).

In one embodiment, the routing platform 105 is configured to monitor the user and/or the vehicle in order to generate travel status information. In addition, the routing platform 105 may present to the user a real-time status of the vehicle, and/or an estimated or predicted status of the vehicle to arrive at a meetup location. The status information may also be associated with timestamp information and/or other contextual information (including user appointment records) to store in the transportation database 113.

In another embodiment, the routing platform 105 may present to the user a spatial-temporal mobility pattern of a vehicle with respect to a user based on user appointments, information on points of interest, parking areas, road segments, and/or related information retrieved from the geographic database 119, while the user is traveling in the vehicle. In addition or alternatively, such information can be provided by the service platform 109, one or more services 109a-109m (also collectively referred to as services 109), one or more content providers 115a-115k (also collectively referred to as content providers 115), or a combination thereof. For example, the sources of the information may include map data, information inferred from data collected from participating UE 101, vehicles 103, or a combination thereof.

In one embodiment, apart from a spatial-temporal mobility pattern of a vehicle with respect to a user based on user appointments, the routing platform 105 may also update the information as a map overlay that illustrates, for instance, timestamps, a number of alternate routes available, and traffic fluctuations around the user location, on the alternate routes, etc., based on real-time transport data from the transportation database 113.

As shown in FIG. 1A, the routing platform 105 operates in connection with UEs 101 and vehicles 103 for determining and presenting a spatial-temporal mobility pattern of a vehicle with respect to a user based on user appointments. By way of example, the UEs 101 may be any mobile computer including, but not limited to, an in-vehicle navigation system, vehicle telemetry device or sensor, a personal navigation device ("PND"), a portable navigation device, a cellular telephone, a mobile phone, a personal digital assistant ("PDA"), a wearable device, a camera, a computer and/or other device that can perform navigation or location based functions, i.e., digital routing and map display. In some embodiments, it is contemplated that mobile computer can refer to a combination of devices such as a cellular telephone that is interfaced with an on-board navigation system of an autonomous vehicle or physically connected to the vehicle for serving as the navigation system. Also, the UEs 101 may be configured to access a communication network 107 by way of any known or still developing communication protocols. Via this communication network 107, the UE 101 may transmit probe data as well as access various network based services for facilitating determining and presenting a spatial-temporal mobility pattern of a vehicle with respect to a user based on user appointments.

Also, the UEs 101 may be configured with applications 111 for interacting with one or more content providers 115, services of the service platform 109, or a combination thereof. Per these services, the applications 111 of the UE 101 may acquire context data, routing instructions, traffic information, mapping information and other data associated with the current locations of the user and the vehicle, etc. Hence, the content providers 115 and service platform 109 rely upon the gathering of user context data, vehicle trajectory data and routing data for executing the aforementioned services.

The UEs 101 and the vehicles 103 may be configured with various sensors 110 for acquiring and/or generating trajectory data regarding the user, a vehicle, other vehicles, conditions regarding the driving environment or roadway, etc. For example, sensors 110 may be used as GPS receivers for interacting with one or more satellites 117 to determine and track the current speed, position and location of a user and/or a vehicle travelling along a roadway. In addition, the sensors 110 may gather tilt data (e.g., a degree of incline or decline of the vehicle during travel), motion data, light data, sound data, image data, weather data, temporal data and other data associated with UEs 101 and/or the vehicle 103 thereof. Still further, the sensors 110 may detect local or transient network and/or wireless signals, such as those transmitted by nearby devices during navigation of a vehicle along a roadway. This may include, for example, network routers configured within a premise (e.g., home or business), another UE 101 or vehicle 103 or a communicable traffic system (e.g., traffic lights, traffic cameras, traffic signals, digital signage). In one embodiment, the routing platform 105 aggregates probe data gathered and/or generated by the UEs 101 and/or the vehicle 103 resulting from the driving of multiple different vehicles over a road/travel network. The probe data may be aggregated by the routing platform 105 to determine traffic and then present a spatial-temporal mobility pattern of a vehicle with respect to a user based on user appointments and the traffic.

By way of example, the routing platform 105 may be implemented as a cloud based service, hosted solution or the like for performing the above described functions. Alternatively, the routing platform 105 may be directly integrated for processing data generated and/or provided by service platform 109, content providers 115, and/or applications 111. Per this integration, the routing platform 105 may determine and present a spatial-temporal mobility pattern of a vehicle with respect to a user based on user appointments, as well as perform routes calculation based on the spatial-temporal mobility pattern.

By way of example, the communication network 107 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

By way of example, the UEs 101, the vehicles 103, the routing platform 105, the service platform 109, and the content providers 115 communicate with each other and other components of the communication network 107 using well known, new or still developing protocols. In this context, a protocol includes a set of rules defining how the network nodes within the communication network 107 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically affected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical layer 1) header, a data-link (layer 2) header, an internetwork (layer 3) header and a transport (layer 4) header, and various application (layer 5, layer 6 and layer 7) headers as defined by the OSI Reference Model.

FIG. 1B is a diagram of the transportation database 113, according to one embodiment. In one embodiment, vehicle information and/or any other information used or generated by the system 100 with respect to determine and present a spatial-temporal mobility pattern of a vehicle with respect to a user based on user appointments based on routing data 121 stored in the transportation database 113 and associated with and/or linked to the geographic database 119 or data thereof. In one embodiment, the routing data 121 include node and road segment data 123, vehicle data 125, traffic data 127, user profile data 129, user context data 131, indexes 133, etc.

In exemplary embodiments, the node and road segment data 123 includes road segment data records that are links or segments representing roads (e.g., a travel network), streets, parking areas, or paths, as can be used in the calculated route or recorded route information for determination of one or more personalized routes, according to exemplary embodiments. The node and road segment data 123 also includes node data records that are end points corresponding to the respective links or segments of the road segment data records. The road link data records and the node data records represent a road network or travel network, such as used by vehicles, cars, and/or other entities. Alternatively, the geographic database 119 can contain road segment and node data records or other data that represent pedestrian paths or areas in addition to or instead of the vehicle road record data, for example.

The road link and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, parking areas (attributes on which parking areas are critical) etc. The geographic database 119 can include data about the POIs and their respective locations. The geographic database 119 can also include data about places, such as cities, towns, or other communities, and other geographic features, such as bodies of water, mountain ranges, etc. Such place or feature data can be part of the POI data or can be associated with POIs or POI data records (such as a data point used for displaying or representing a position of a city).

In one embodiment, the vehicle data 125 can include any vehicle data item used by the routing platform 105 including, but not limited to vehicle type data, vehicle ownership data, vehicle route and step data, real-time vehicle trajectory data, parking instance data, timestamp information for the parking instance data, etc. for estimating the estimated arrival time for the vehicle to arrive at a user pickup location (i.e., at or in vicinity of the current appointment, and generating route options to get to the next appointment. In one embodiment, the traffic data 127 includes, but not limited to, travel speeds, congestions, detours, vehicle types and volumes, accidents, road conditions, road works, etc. on specific road segments.

In another embodiment, the traffic data 127 can be used in junction with the user profile data 129 and the user context data 131 for estimating an estimated arrival time for the vehicle to arrive at a user pickup location and generating route options to the next appointment.

In one embodiment, the user profile data 129 includes, but not limited to, the name, name, login named, screen named, nicknamed, handle names, home addresses, email addresses, government identification numbers, operator license/credential types (motorcycle, regular passenger vehicle, commercial vehicle, etc.), vehicle registration plate numbers, face, fingerprints, handwriting, credit card numbers, digital identities, date of birth, age, birthplace, genetic information (e.g., gender, race, etc.), telephone numbers, marriage status/records, criminal records, purchase records, financial data, activity records, employment records, insurance records, medical records, political and non-political affiliations, preferences (e.g., POIs), calendar data, driving history data, vehicle sharing data, etc. of the user.

In one embodiment, the user context data 131 includes, but not limited to, user appointment records each includes an appointment location of the user, a type of the appointment location of the user, a proximity of the user location to the appointment location or a user pickup location, availability of an alternate user pickup location, a number of passengers accompanying the user, weather data in the vicinity of the appointment location or the user pickup location, etc.

More, fewer or different data records can be provided in the transportation database 113. One or more portions, components, areas, layers, features, text, and/or symbols of the routing data records in the transportation database 113 can be stored in, linked to, and/or associated with one or more of the data records of the geographic database 119 (such as mapping and/or navigation data).

In one embodiment, the geographic database 119 includes geographic data used for (or configured to be compiled to be used for mapping and/or navigation-related services, such as for route information, service information, estimated time of arrival information, location sharing information, speed sharing information, and/or geospatial information sharing, according to exemplary embodiments. For example, the geographic database 119 includes node data records, road segment or link data records, POI data records, parking availability data records, and other data records.

In exemplary embodiments, the road segment data records are links or segments representing roads, streets, or paths, as can be used in the calculated route or recorded route information. The node data records are end points corresponding to the respective links or segments of the road segment data records. The road link data records and the node data records represent a road network, such as used by vehicles, cars, and/or other entities. Alternatively, the geographic database 119 can contain path segment and node data records or other data that represent pedestrian paths or areas in addition to or instead of the vehicle road record data, for example.

The road link and nodes can be associated with attributes, such as geographic coordinates, street names, address ranges, speed limits, turn restrictions at intersections, and other navigation related attributes, as well as POIs, such as traffic controls (e.g., stoplights, stop signs, crossings, etc.), gasoline stations, hotels, restaurants, museums, stadiums, offices, automobile dealerships, auto repair shops, buildings, stores, parks, etc. The geographic database 119 can include data about the POIs and their respective locations in the POI data records. The geographic database 119 can also include data about places, such as cities, towns, or other communities, and other geographic features, such as bodies of water, mountain ranges, etc.

The transportation database 113 and/or the geographic database 119 can be maintained by the content provider in association with the service platform 109 (e.g., a map developer). The map developer can collect driving/parking data and geographic data to generate and enhance the transportation database 113 and/or the geographic database 119. There can be different ways used by the map developer to collect data. These ways can include obtaining data from other sources, such as municipalities or respective geographic authorities.

The transportation database 113 and/or the geographic database 119 can be stored in a format that facilitates updating, maintenance, and development of the relevant data. For example, the data in the transportation database 113 and/or the geographic database 119 can be stored in an Oracle spatial format or other spatial format. The Oracle spatial format can be compiled into a delivery format, such as a geographic data files (GDF) format to be compiled or further compiled to form geographic database products or databases, which can be used in end user navigation devices or systems.

As mentioned above, the transportation database 113 and the geographic database 119 are separated databases, but in alternate embodiments, the transportation database 113 and the geographic database 119 are combined into one database that can be used in or with end user devices (e.g., UEs 101) to provide navigation-related functions and provide vehicle information. For example, the databases 113, 119 are assessible to the UE 101 directly or via the routing platform 105. In another embodiments, the databases 113, 119 can be downloaded or stored on UE 101, such as in applications 111.

All data exchanged herein complies with all privacy related laws, privacy settings, rules, policies set by the user, etc. for example, the mobility patterns are computed based on the information that the user allows the system 100 to use.

Figure 2:
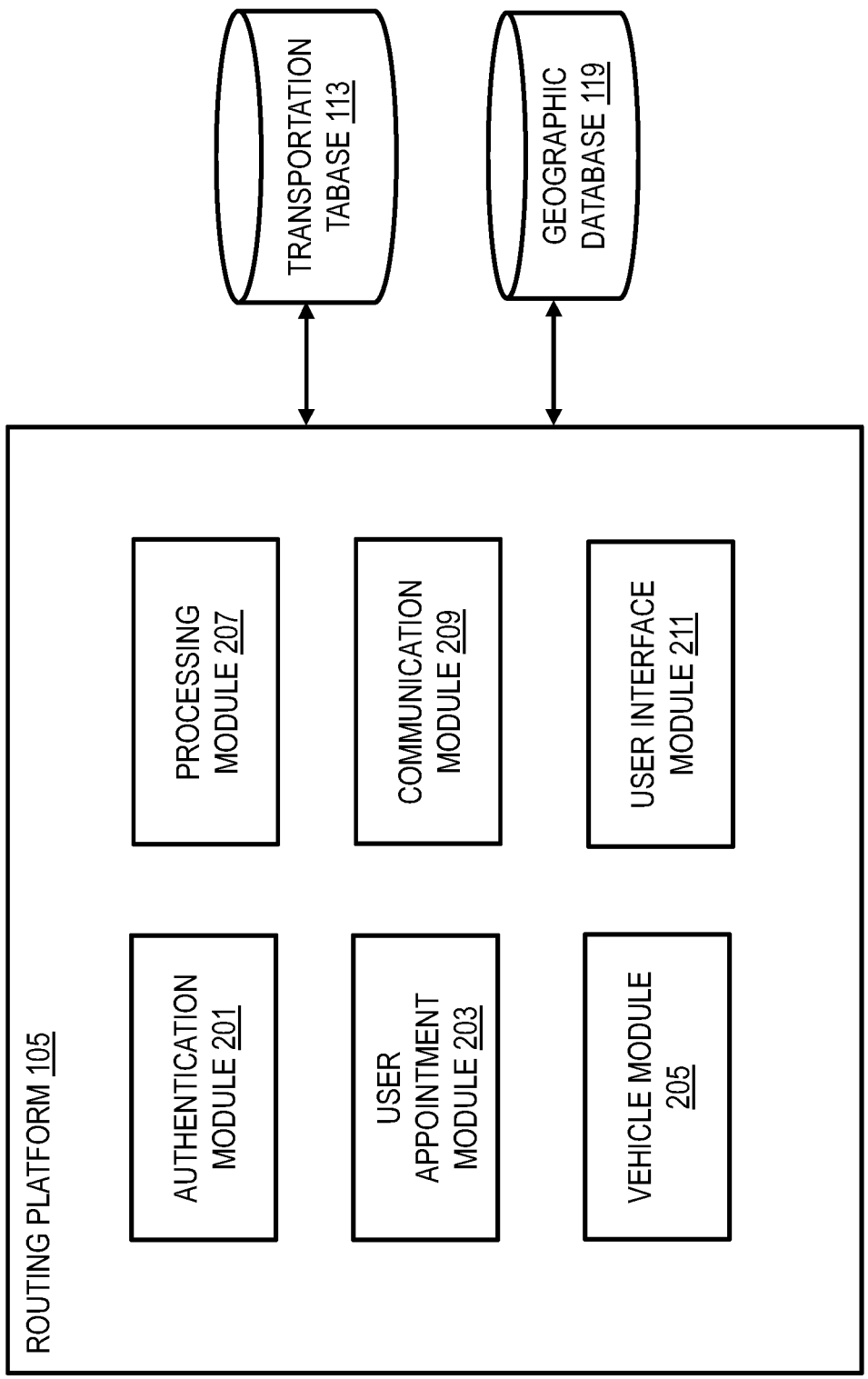
FIG. 2 is a diagram of the components of a routing platform, according to one embodiment.

FIG. 2 is a diagram of the components of a routing platform, according to one embodiment. By way of example, the routing platform 105 includes one or more components for determining and presenting a spatial-temporal mobility pattern of a vehicle with respect to a user based on user appointments. It is contemplated that the functions of these components may be combined or performed by other components of equivalent functionality. In this embodiment, the routing platform 105 includes an authentication module 201, a user appointment module 203, a vehicle module 205, a processing module 207, a communication module 209, and a user interface module 211.

In one embodiment, the authentication module 201 authenticates UEs 101 and/or associated vehicles 103 for interaction with the routing platform 105. By way of example, the authentication module 201 receives a request to access the routing platform 105 via an application 111. The request may be submitted to the authentication module 201 via the communication module 209, which enables an interface between the application 111 and the platform 105. In addition, the authentication module 201 may provide and/or validate access by the UE 101 to upload trajectory data, and/or other location-based information to the platform 105. In one embodiment, the authentication module 201 may further be configured to support and/or validate the formation of profile by a provider of a service 109 or content provider 115, e.g., for supporting integration of the capabilities for determining and presenting a spatial-temporal mobility pattern of a vehicle with respect to a user based on user appointments with said providers 115 or services 109.

The user appointment module 203 retrieves the user profile data 129 and the user context data 131 (including explicit and implicit user appoints/events and associated schedules and timestamps) from various sources such as user calendars, user emails, user social media posts, the transportation database 113, etc. In one embodiment, the user appointment module 203 aggregates user schedules of various online and/or offline sources. It then stores the received data to database 113 optionally in association with a unique identifier of the various sources of the data.

The vehicle module 205 collects and/or analyzes trajectory data (including associated timestamps) as generated by one or more authenticated UE 101 and one or more vehicles 103. For example, the vehicle module 205 aggregates the trajectory data of travel segments generated by the UE 101 and the one or more vehicles 103. In one embodiment, the vehicle module 205 may receive other related data along with the trajectory data or segment lists such as acceleration, road curvature, vehicle tilt, driving mode, brake pressure, etc. It then stores the received data to database 113 optionally in association with a unique identifier of the vehicle, driver of UE 101 that transmitted the trajectory data or lists.

In one embodiment, the processing module 207 monitors a user location and a vehicle location based on real-time trajectory data. In another embodiment, the processing module 207 estimates the user location on the another segment based on the last known location and estimates the user movement based on predicted movement of the different mode of transport, such as walking, cycling, buses, etc., in absence of real-time trajectory data, such as the user is traveling in a poor GPS coverage area. With the location information, the processing module 207 determines and presents a spatial-temporal mobility pattern of a vehicle with respect to a user based on user appointments, for example, to provide freedom to the vehicle to travel away from the user to run errands/tasks (e.g., pickup and/or delivery tasks, vehicle maintenance/clean-up/repair, etc.), to pick up other users for other appointments, etc.

In one embodiment, the processing module 207 determines the spatial-temporal mobility pattern of a vehicle based on user preferences, vehicle behavior patterns, and optionally vehicle errands/tasks, etc. In one embodiment, the user specifies the vehicle needs to be within 10-mile radius from the office, and/or within 10-minute drive from the office. For example, the 10-mile radius from the office may be presented as a circle around the office location in a map view. In another embodiment, the boundary of the 10-minute drive from the office may be determined using dynamic (or real time) traffic monitoring and timing adjustments, and a time-based isoline routing algorithm to request a polyline that connects the end points of all routes leaving from office with a specified travel time (e.g., 10 minutes).

For example, when the vehicle is set to pick up a cake at location X which is 15-mile drive away from the user's office, the system 100 can adjust the spatial-temporal mobility pattern of the vehicle to go beyond 10-mile constraint to pick the cake within the given time frame when the user is at work.

As another example, the user rides the vehicle to work for the whole morning, another family member may use the vehicle to go to a dental appointment that can be finished before the primary user's business lunch appointment. However, if the dental appointment gets delayed and leads to a conflict of vehicle user by the primary user and another user, the processing module 207 calculates and compares cost function scores of (1) an option of delivering the primary user to the lunch appointment, waiting nearby, delivering the primary user back to the office, picking up the other user from the dental appointment then to home; (2) an option of delivering the primary user to the lunch appointment, waiting nearby, delivering the primary user back to the office, and skipping the other user (who may use other transport to get home); and (3) picking up the other user from the dental appointment then to home, and skipping the primary user (who may use other transport to get back to the office).

In one embodiment, the processing module 207 computes a cost function score for each of the options via computing a cost function score for each of the options based on a number of features (n) shared between the options using an equation including a weighting vector (w), a feature cost vector (r), a feature probability vector (p):

$$\cos t(r, p) = \sum_{i=1 \to n} w_i r_i p_i$$

where i=1 to the number of features shared between the options. In this instance, the features may include distances and/or traffic conditions of segments to be traveled, fuel cost of the vehicle, coverages, availability, and cost of alternative transport modes of the segments, as well as user profile, user preferences of the primary user and the other user, etc.

In one embedment, the processing module 207 automatically executes the optimal option. In another embodiment, the processing module 207 presents the options and cost function scores on a user interface and prompts for a user selection, including the primary user and/or the other user. The choice of the primary user and the choice of the other user may carry equal or different weight for deciding the optimal option. The processing module 207 then updates the spatial-temporal mobility pattern of the vehicle based on the optimal option.

In one embodiment, once a spatial-temporal mobility pattern of a vehicle with respect to a user based on user appointments is determined, the processing module 207 can interact with the communication module 209 and/or the user interface module 211 to present to the user the spatial-temporal mobility pattern. After the user updates the spatial-temporal mobility pattern via a calendar view and/or a map view, the processing module 207 can interact with the communication module 209 and/or the user interface module 211 to present to the user the updated spatial-temporal mobility pattern and timing information, related navigation instructions, and/or other information related to the coming appointments.

Since there can be delays caused by predictive and/or live traffic, weather, etc. for the vehicle to meet up with the user, the processing module 207 updates the vehicle location, the alternate meetup location, or a combination thereof based on data from the transportation database 113 that is obtained via real-time monitoring by the system 100. In one embodiment, the processing module 207 updates the spatial-temporal mobility pattern based on the updated user location, the updated vehicle location, and/or alternate meetup location.

In cases of multiple users sharing one or more vehicles, the processing module 207 considers the transportation needs of all users, their mobility patterns, and generates an aggregated spatial-temporal mobility pattern of the vehicles with respect to the users based on all user appointments. The processing module 207 may use different colors and/or styles to code each user's appointments in one user interface shared by all the users. When the processing module 207 updates an aggregated spatial-temporal mobility pattern for one user, the update will be shown to all the users, in order to reflect the interdependencies between the users and the vehicles. The processing module 207 alerts the users as soon as it detects that one trip is not possible any more based on some factor changes. For example, if one family member needs to go to an emergency room, taking the primary user to the next appointment by the vehicle may be infeasible. The processing module 207 then recommends alternative transport modes for the primary user.

It is further noted that the user interface module 211 may operate in connection with the communication module 209 to facilitate the exchange of real-time location information and/or context information via the communication network 107 with respect to the services 109, content providers 115 and applications 111. Alternatively, the communication module 209 may facilitate transmission of the real-time location information and/or the context information directly to the services 109 or content providers 115.

The above presented modules and components of the routing platform 105 can be implemented in hardware, firmware, software, or a combination thereof. Though depicted as a separate entity in FIG. 1A, it is contemplated that the platform 105 may be implemented for direct operation by respective UEs 101 and/or vehicles 103. As such, the routing platform 105 may generate direct signal inputs by way of the operating system of the UE 101 and/or vehicles 103 for interacting with the application 111. In another embodiment, one or more of the modules 201-211 may be implemented for operation by respective UEs 101 and/or vehicles 103 as a platform 105, cloud based service, or combination thereof.

Figure 3:
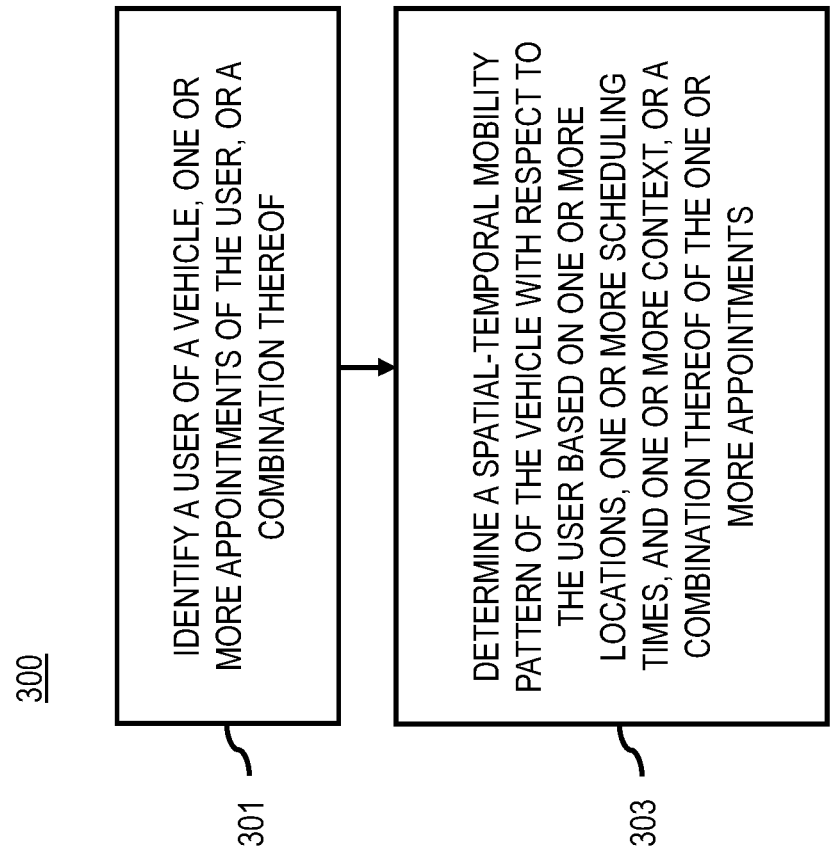
FIG. 3 is a flowchart of a process for determining and presenting a spatial-temporal mobility pattern of a vehicle with respect to a user based on user appointments, according to one embodiment.
Figure 9:
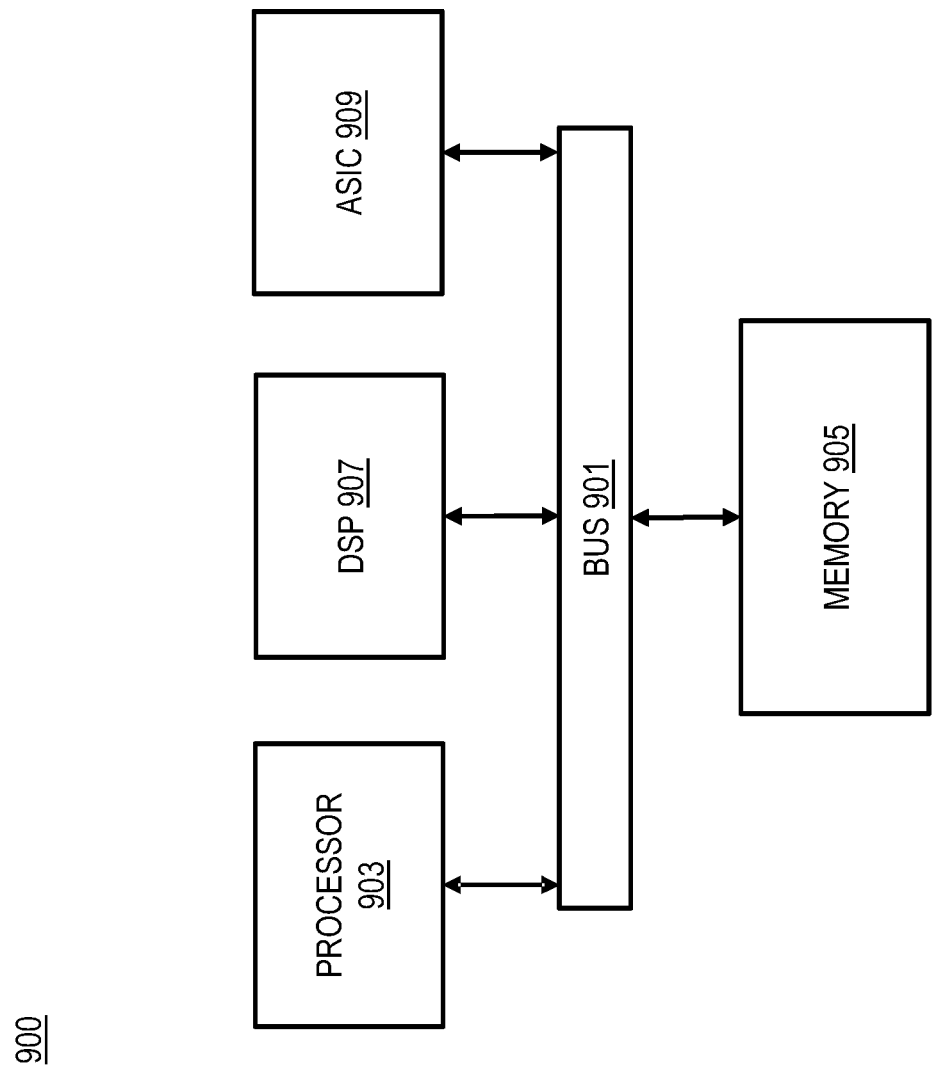
FIG. 9 is a diagram of a chip set that can be used to implement an embodiment of the invention.

FIG. 3 is a flowchart of a process for determining and presenting a spatial-temporal mobility pattern of a vehicle with respect to a user based on user appointments, according to one embodiment. In one embodiment, the routing platform 105 performs the process 300 and is implemented in, for instance, a chip set including a processor and a memory as shown in FIG. 9. In addition or alternatively, all or a portion of the process 300 may be performed locally at the UE 101 and/or vehicle 103 (e.g., via the application 111 or another equivalent hardware and/or software component).

In step 301, the routing platform 105 identifies a user of a vehicle, one or more appointments of the user, or a combination thereof. To simplify the discussion, only one user and one vehicle are used for illustration, as described later in conjunction with FIGS. 4-7. FIGS. 4A-4J are diagrams of a user interface used in the processes for presenting a spatial-temporal mobility pattern of a vehicle with respect to a user based on user appointments, according to various embodiments. The spatial-temporal mobility pattern provides an overview of the user's day and the vehicle's proximity to the user during the day. The user can control the vehicle's proximity to the user by manipulating the spatial-temporal mobility pattern in a calendar view or a map view, while the manipulating in one view will be reflected in the other view.

Figure 4A:
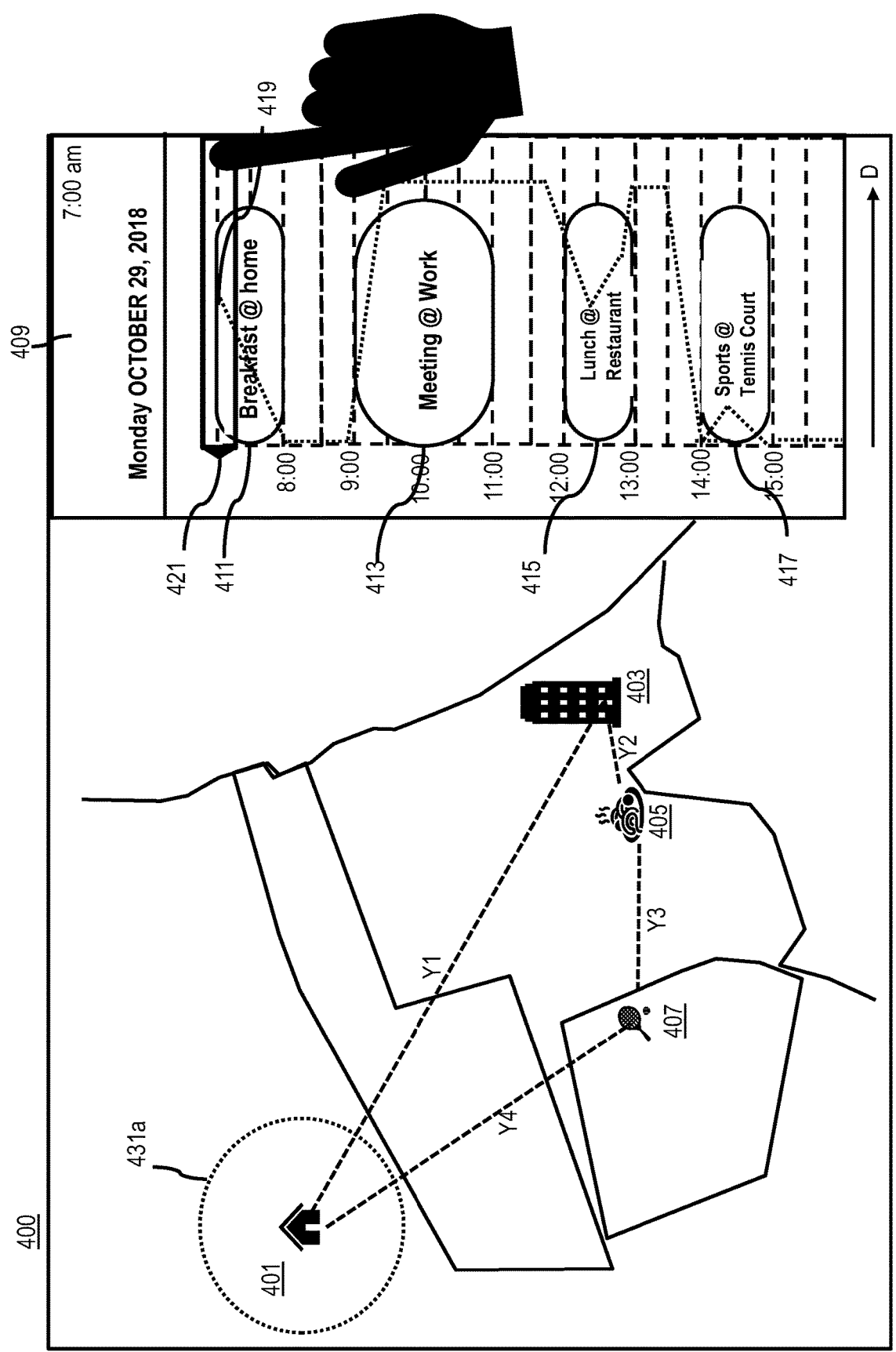
Figure 4B:
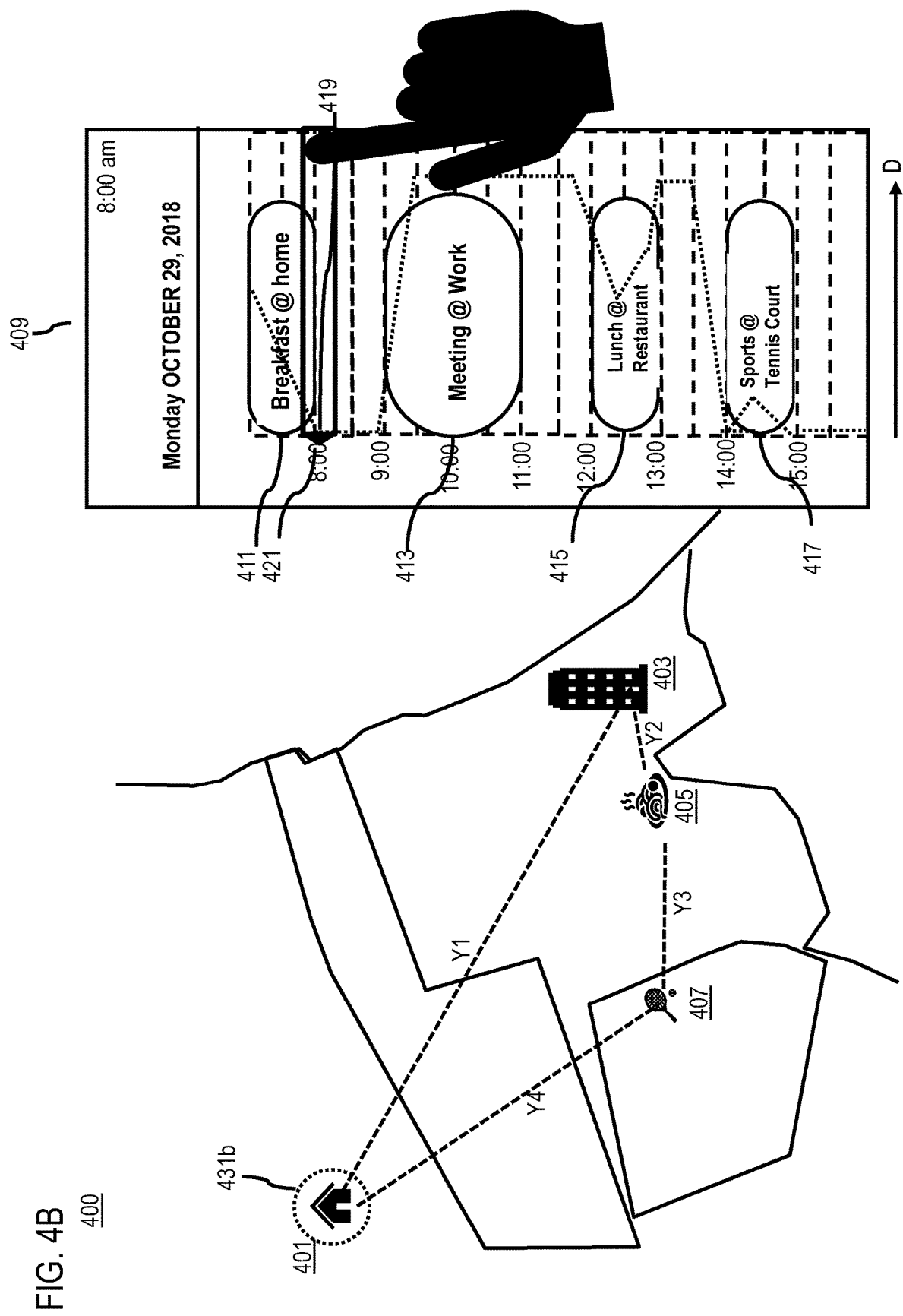

FIG. 4A depicts in a user interface 400 that include a map view of the locations where the user will be on the left and a calendar view of the user's appointments on the right. The map view shows the user will be at the user's home 401, travels to the user's office 403 via a road segment Y1, travel to a restaurant 405 via a road segment Y2, travel to a tennis court 407 via a road segment Y3, and then travel back to home 401 via a road segment Y4. The calendar view includes a current time box 409 (e.g., Monday Oct. 29, 2018 7:00 am), four user appointments, including an appointment 411 of eating breakfast at home during 7:00-8:00 am, an appointment 413 of meeting at work during 9:00-11:00 am, an appointment 415 of eating lunch at a restaurant during 12:00-13:00, and an appointment 417 of playing tennis at a tennis court during 14:00-15:00, a spatial-temporal mobility pattern of a vehicle 419 with respect to a user based on the user appointments, and a slide bar 421. The spatial-temporal mobility pattern 419 and the slide bar 421 will be described in conjunction with FIG. 4A-4J.

In an actual time mode, the slide bar 421 (e.g., a hollow rectangle bar) moves on its own upwards or downwards the calendar, with an arrow of the slide bar 421 pointing to the left and aligning with a current time point line, e.g., 7:00 am. In a simulation mode, the user moves the slide bar 421 upwards or downwards the calendar, with the arrow of the slide bar 421 pointing to the left and aligning with a desired time point line e.g., 7:00 am. The simulation mode is used as an example for the following discussion.

In one embodiment, the slide bar 421 is moved upwards and downwards via a user keyboard input, such as typing, a mouse input, a touchpad input, etc. In another embodiment, the slide bar 421 is moved via a user touch screen input, such as single or multi-touch gestures by touching the screen with a special stylus/pen or one or more fingers. In another embodiment, the slide bar 421 is moved via a user voice command.

In step 303, the routing platform 105 determines a spatial-temporal mobility pattern of the vehicle with respect to the user based on one or more locations, one or more scheduling times, and one or more context, or a combination thereof of the one or more appointments. As mentioned, the spatial-temporal mobility pattern 419 may be manually set by the user, or automatically set by the routing platform 105 based on user habits/behavior patterns extracted and/or predicted based on the context data and/or trajectory data from the transportation database 113 and/or geographic database 119. Referring back to FIG. 4A, when the user moves the slide bar 421 upwards or downwards the calendar, with an arrow of the slide bar 421 pointing to the left and aligning with a time point line of 7:00 am while crossing a point of the spatial-temporal mobility pattern 419 at a middle point of the time point line of 7:00 am. A distance scale, i.e., an D axis at the bottom of the calendar view, represents a distance limit from the vehicle to a location of the user at 7:00 am (i.e., the user's home). To simplify the discussion, a radius circle is used to show a vehicle's free-travel zone, which can be substituted with an isoline as discussed previously.

For example, the vehicle is allowed to travel as far as 5 miles away from the use's home (e.g., a 5-mile radius from the user's home shown as a circle 431*a*) at 7:00 am. The circle 431*a* shrinks as time passes from 7:00 to 8:00 into a circle 431*b* in FIG. 4B, i.e., the mobility of the vehicle reduces in proportion with time, since the vehicle needs to come back to the user's home at 8:00 am to meet the user for the meeting at 9:00 am.

Figure 4C:
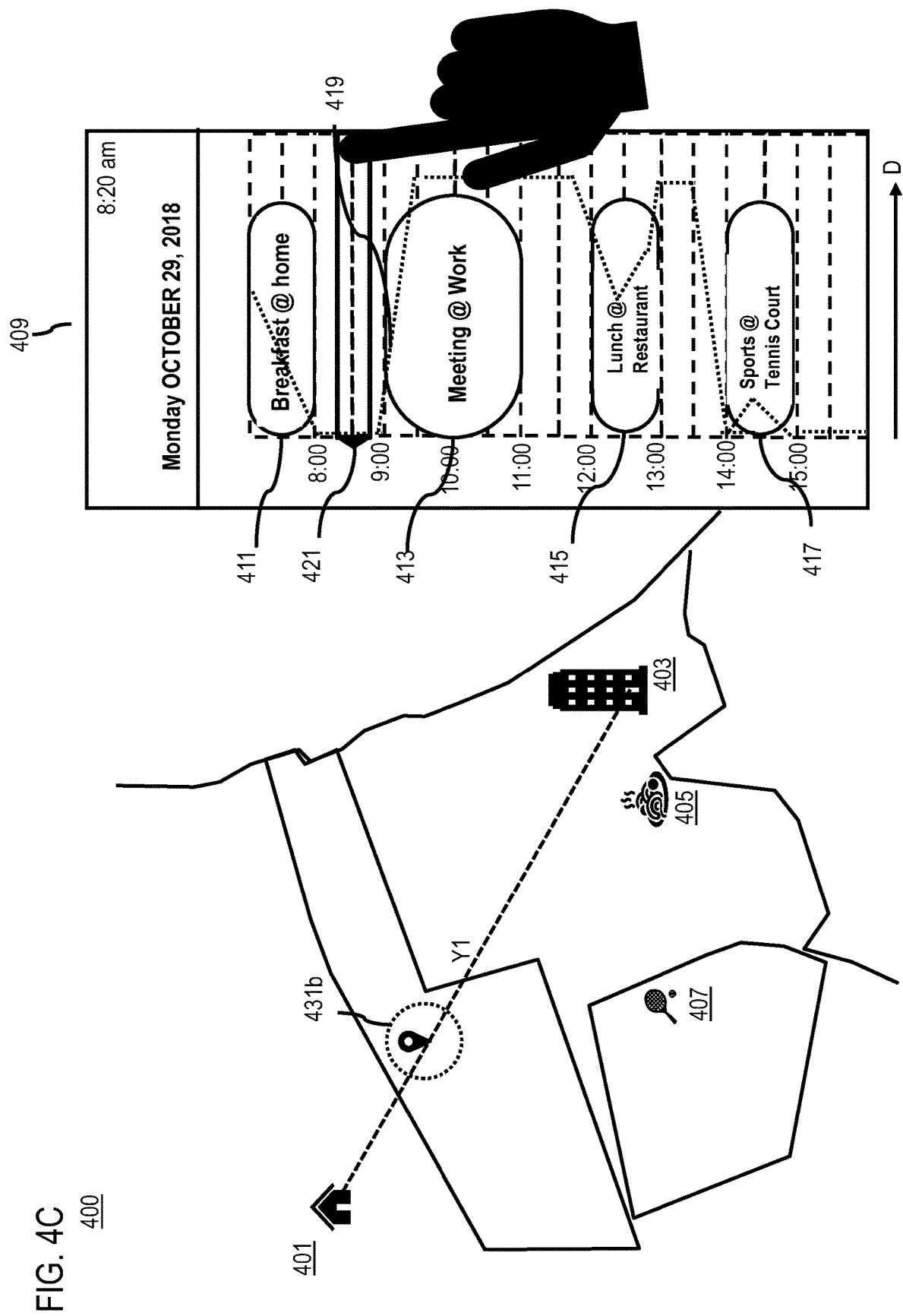

As the slide bar 421 moves further down to a time point line of 8:20 am in FIG. 4C, the user is in the vehicle while riding to work, such that the distance between the user and the vehicle is almost zero, and the circle 431*b* remains the size during the ride to work. As the slide bar 421 moves further down to a time point line of 9:00 am in FIG. 4D, the user and the vehicle arrives at work.

Figure 4E:
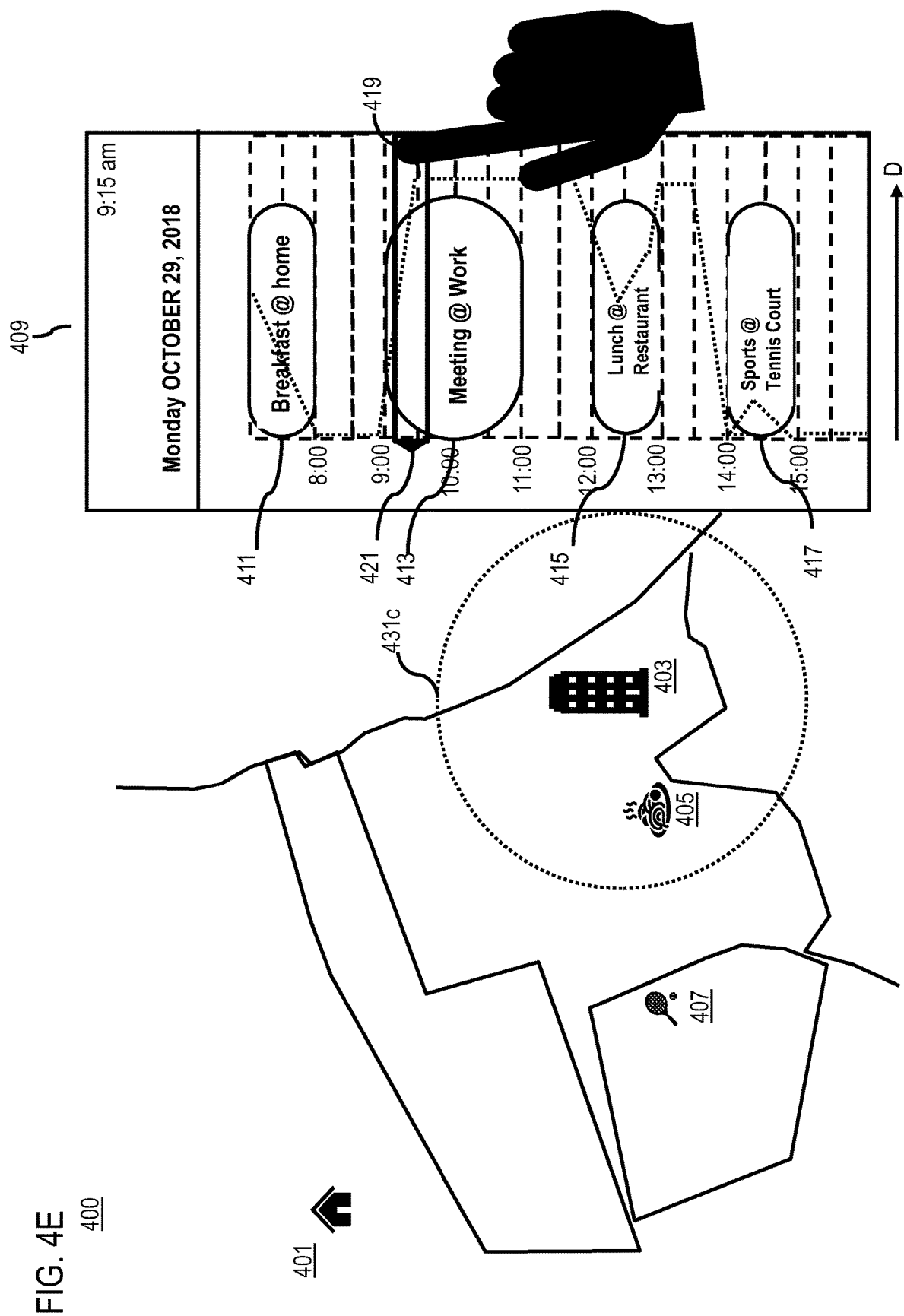

As the slide bar 421 moves further down to a time point line of 9:15 am in FIG. 4E, the user stays at work and the vehicle is free to travel as far as 10 miles away from the use's work (e.g., a 10-mile radius from the user's work shown as a circle 431*c*) from 9:15 am to 11:45 am. The arrow of the slide bar 421 points to the left and aligning with a time point line of 9:15 am while crossing a point of the spatial-temporal mobility pattern 419 at a far right point of the time point line of 9:15 am, that corresponds to the mobility of 10-mile.

As the slide bar 421 moves further down to a time point line of 11:50 am in FIG. 4F, the user is ready to walk from work to a restaurant along the road segment Y2. In one embodiment, since the user does not need the vehicle to go to the restaurant, the vehicle remains free to travel the 10-mile radius from the user such that the circle 431*c* moves with the user from centering at work at 11:50 am to centering at the restaurant at 12:15 pm. For example, the user wants the vehicle to be close when eating in the restaurant, in case there is a work emergency that the user needs to get back to work right away, instead of walking.

Figure 4G:
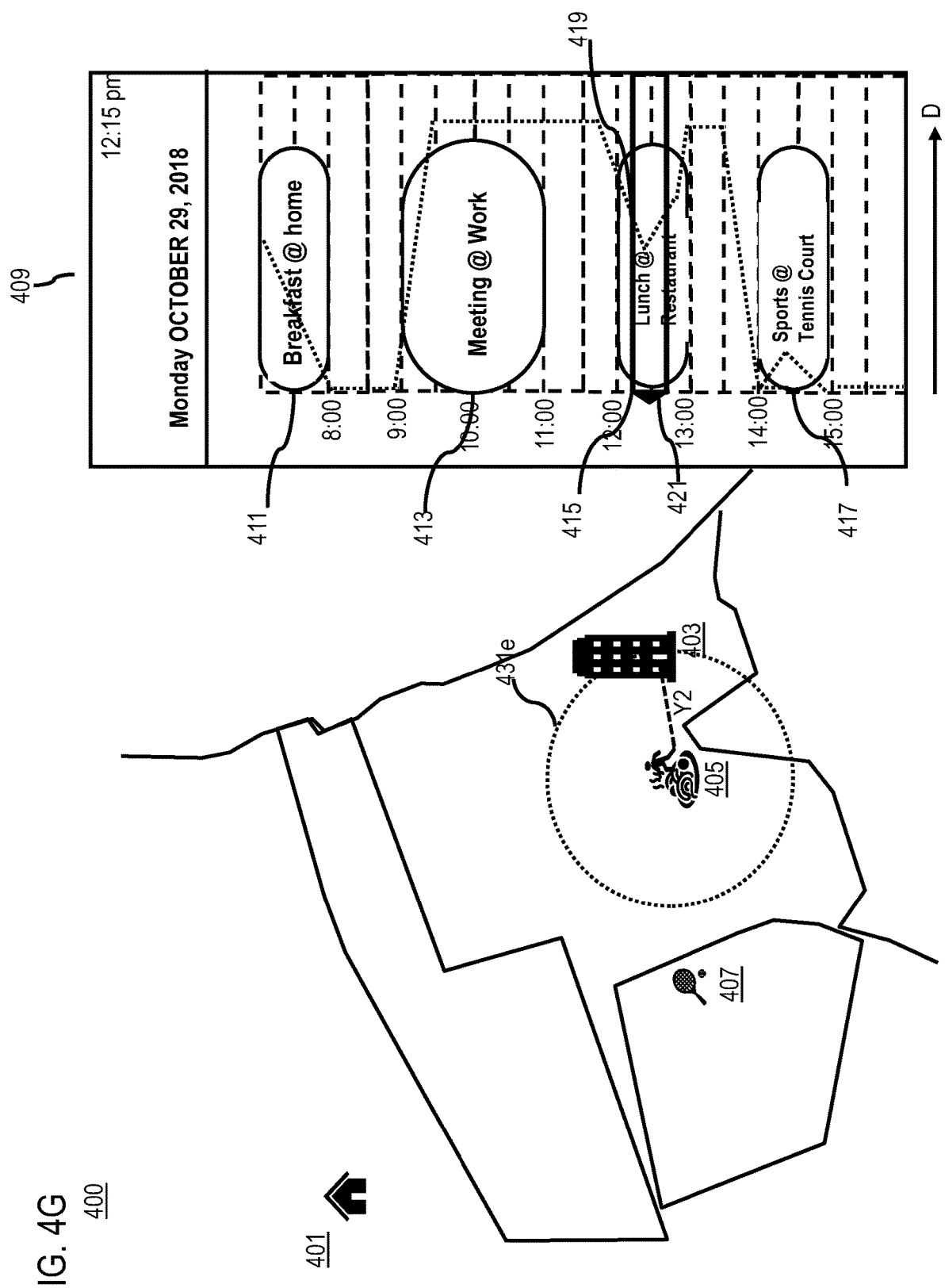

In another embodiment, as the slide bar 421 moves further down to a time point line of 12:15 pm in FIG. 4G, the vehicle's free travel zone circle reduced the 10-mile radius circle 431*c* at work at 11:50 am to a 7.5-mile radius circle 431*c* (in the middle point of Y2) and then to a 5-mile radius circle 431*e* at the restaurant at 12:15 pm.

Figure 4H:
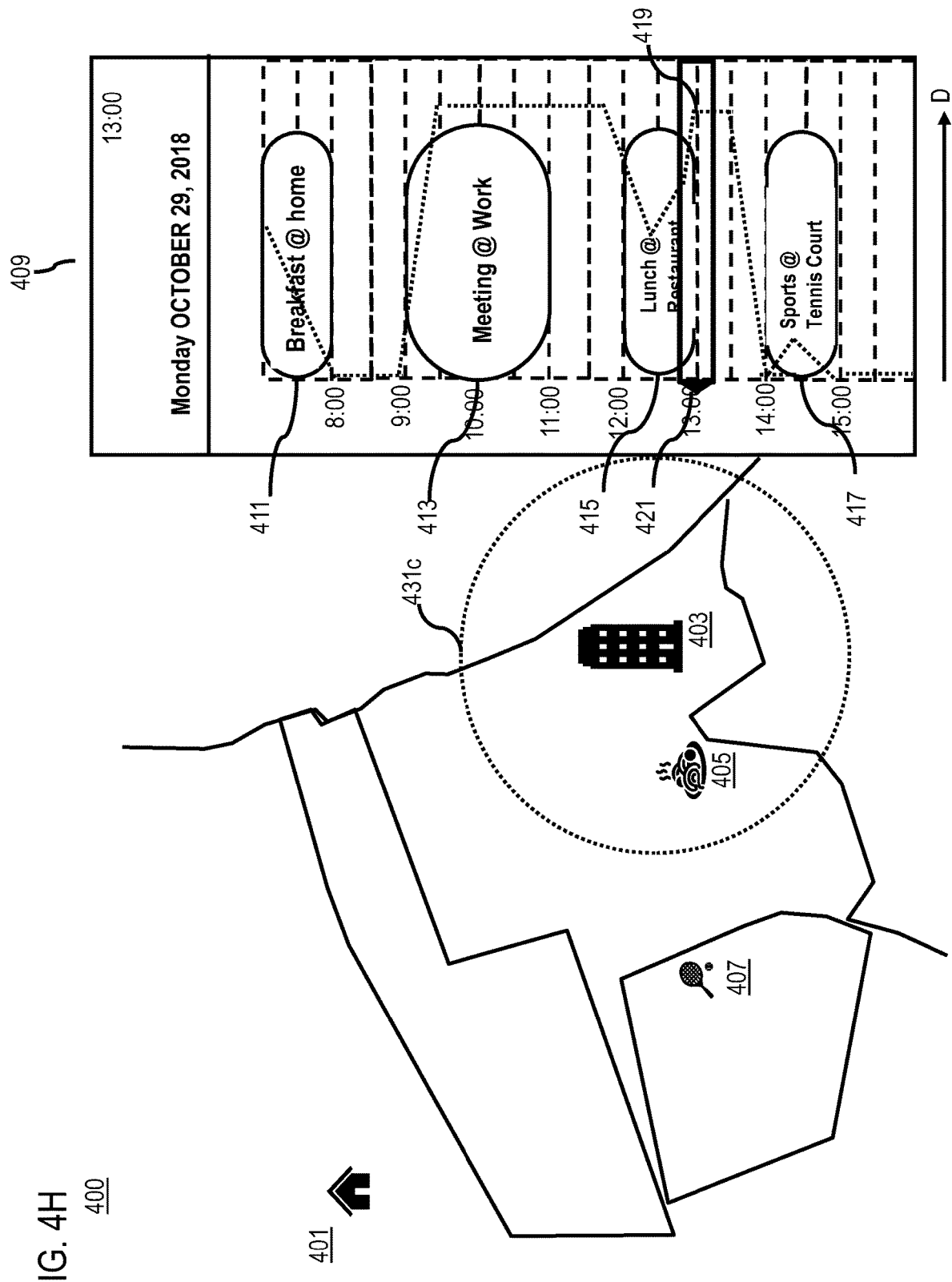

As the slide bar 421 moves further down to a time point line of 13:00 in FIG. 4H, after the user walks back to work, the vehicle becomes free to travel as far as 10 miles away from the user's work again (e.g., the 10-mile radius from the user's work shown as a circle 431*c*).

As the slide bar 421 moves further down to a time point line of 14:00 in FIG. 4I, the user riding in the vehicle along the road segment Y3 arrives at the tennis court, while the vehicle's free travel zone is shown as the circle 431*b* in FIG. 4C, i.e., the mobility of the vehicle is almost zero when carrying the user.

Figure 4J:
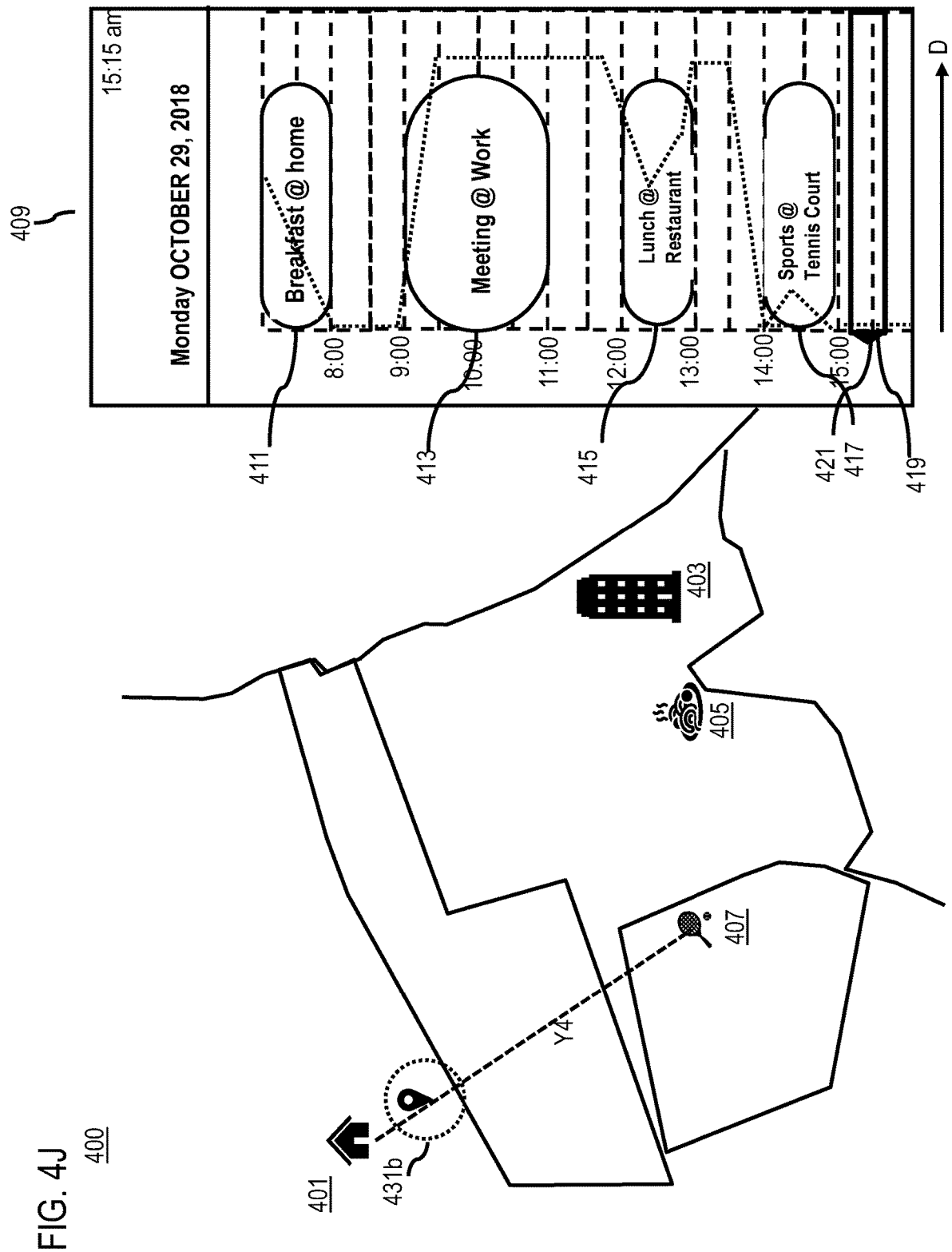

As the slide bar 421 moves further down to a time point line of 15:15 in FIG. 4J, the user riding in the vehicle along the road segment Y4 to go home, while the vehicle's free travel zone is shown as the circle 431*b* in FIG. 4C, i.e., the mobility of the vehicle is almost zero when carrying the user.

Figure 5A:
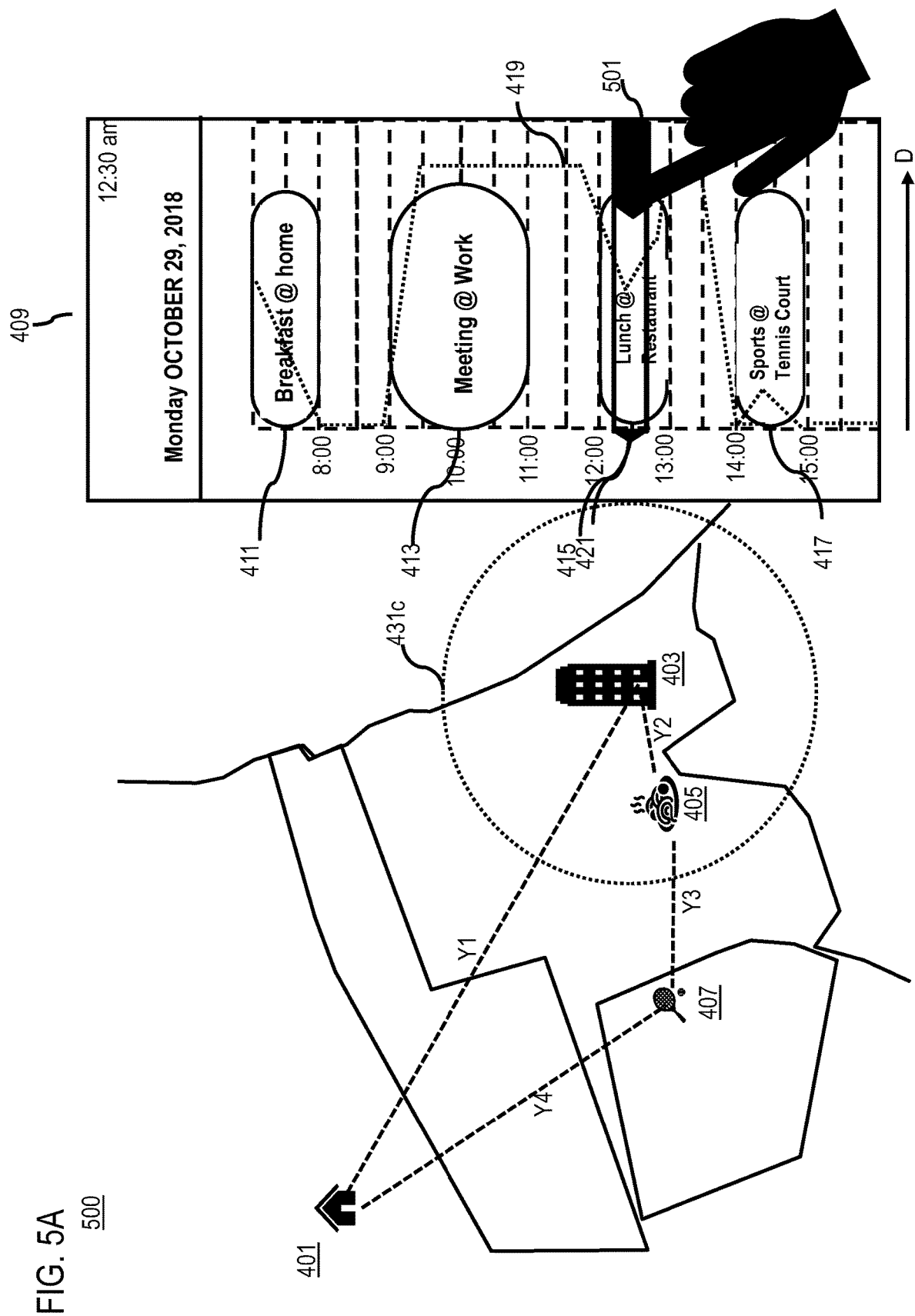
FIGS. 5A-5B are diagrams of a user interface used in a process for deleting an appointment and updating the spatial-temporal mobility pattern of a vehicle with respect to a user based on user appointments, according to one embodiment.
Figure 5B:
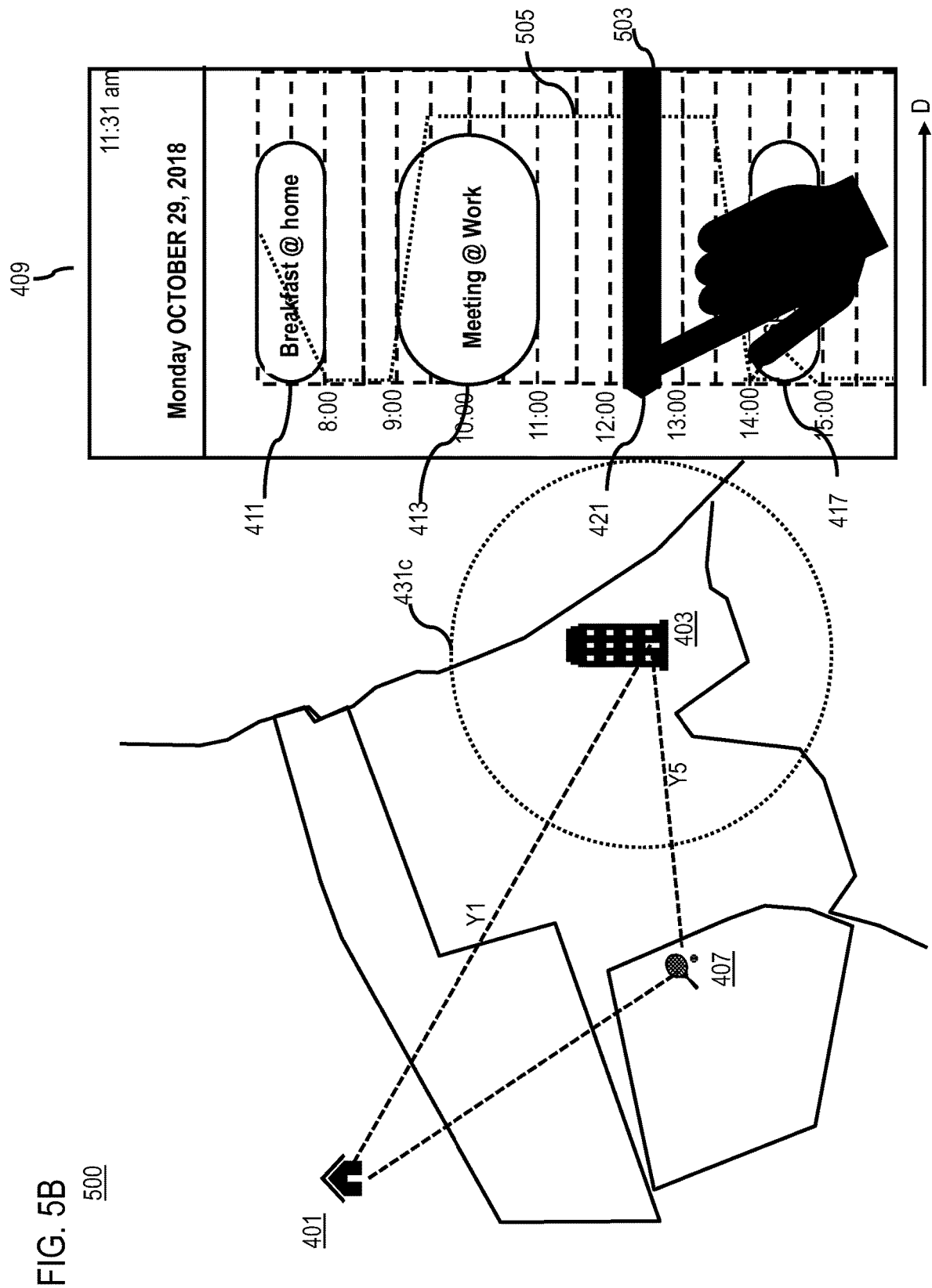

FIGS. 5A-5B are diagrams of a user interface 500 used in a process for deleting an appointment and updating the spatial-temporal mobility pattern of a vehicle with respect to a user based on user appointments, according to one embodiment. In one embodiment, the arrow of the slide bar 421 is moved to a time point line of 12:30 pm, i.e., the middle time point of the lunch appointment in FIG. 5A. By sliding a partial black control bar 501 from left to right to darken the whole slide bar 421 into a fully black control bar 503, the lunch appointment is deleted form the calendar view in FIG. 5B, and the spatial-temporal mobility pattern 419 in FIG. 5A is updated into a spatial-temporal mobility pattern 505 that leaves the vehicle's free travel zone is shown as the circle 431c in FIG. 4E, i.e., the 10-mile radius from the user's work. In addition the road segment Y2 and the road segment Y3 are consolidated into a road segment Y5, FIG. 5B.

In one embodiment, the slide bar 421 is moved left and right via a user keyboard input, such as typing, a mouse input, a touchpad input, etc. In another embodiment, the slide bar 421 is moved via a user touch screen input, such as single or multi-touch gestures by touching the screen with a special stylus/pen or one or more fingers. In another embodiment, the slide bar 421 is moved via a user voice command.

Figure 6A:
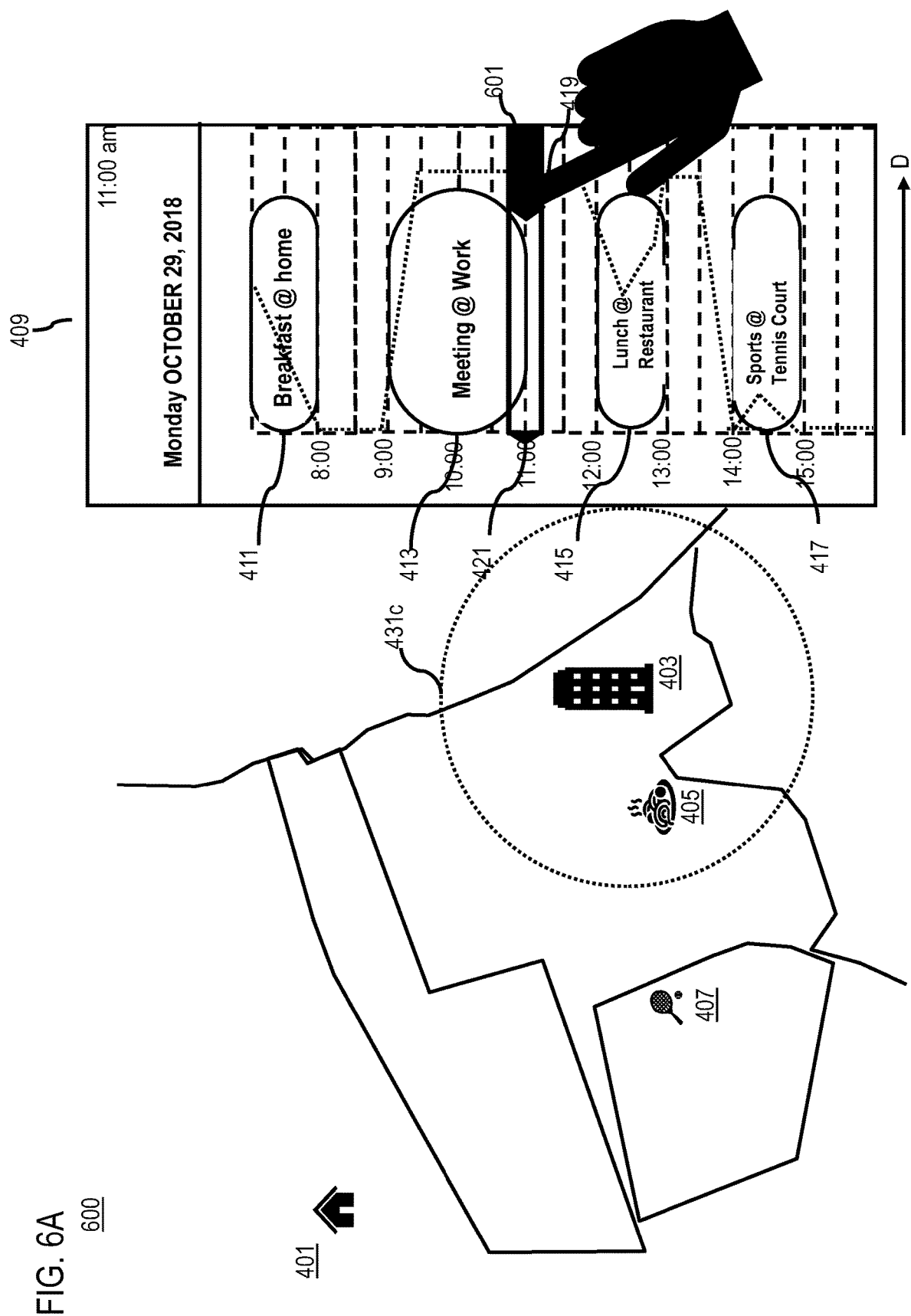
FIGS. 6A-6B are diagrams of a user interface used in a process for adjusting the proximity of the vehicle to the user on a timeline in a calendar, according to one embodiment.
Figure 6B:
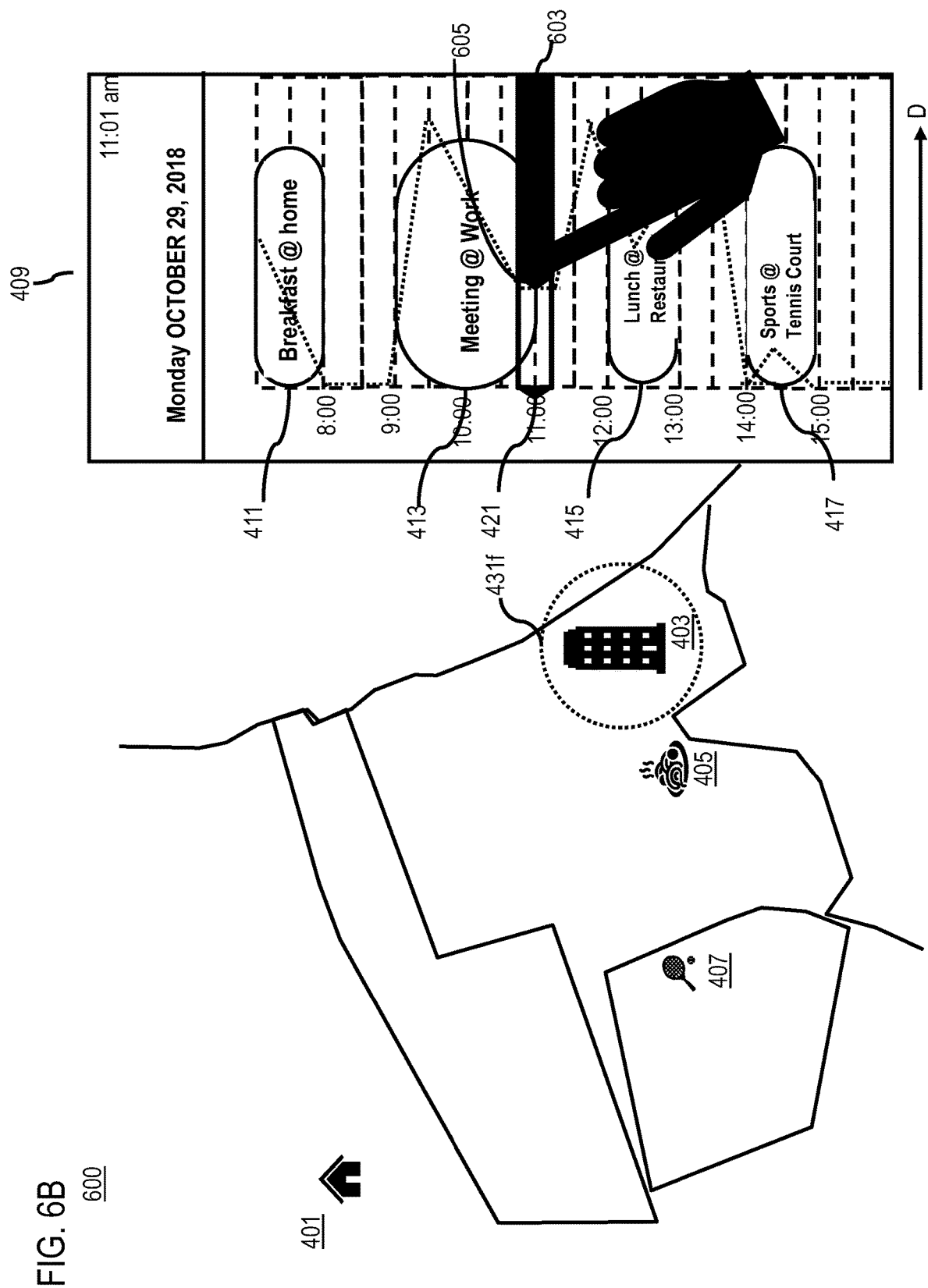

FIGS. 6A-6B are diagrams of a user interface 600 used in a process for adjusting the proximity of the vehicle to the user on a timeline in a calendar, according to one embodiments. In one embodiment, the arrow of the slide bar 421 is moved to a time point line of 11:00 pm, i.e., the end of the work meeting appointment in FIG. 6A. By sliding a partial black control bar 601 from left to right to darken the whole slide bar 421 into a fully black control bar 603, a section 605 of the spatial-temporal mobility pattern 419 covered by the fully black control bar 603 is moved towards left to reduce the vehicle's free travel zone shown as the circle 431c in FIG. 4E, i.e., the 10-mile radius from the user's work, into a vehicle's free travel zone shown as the circle 431f in the calendar view in FIG. 6B, i.e., the 4-mile radius from the user's work.

Figure 7A:
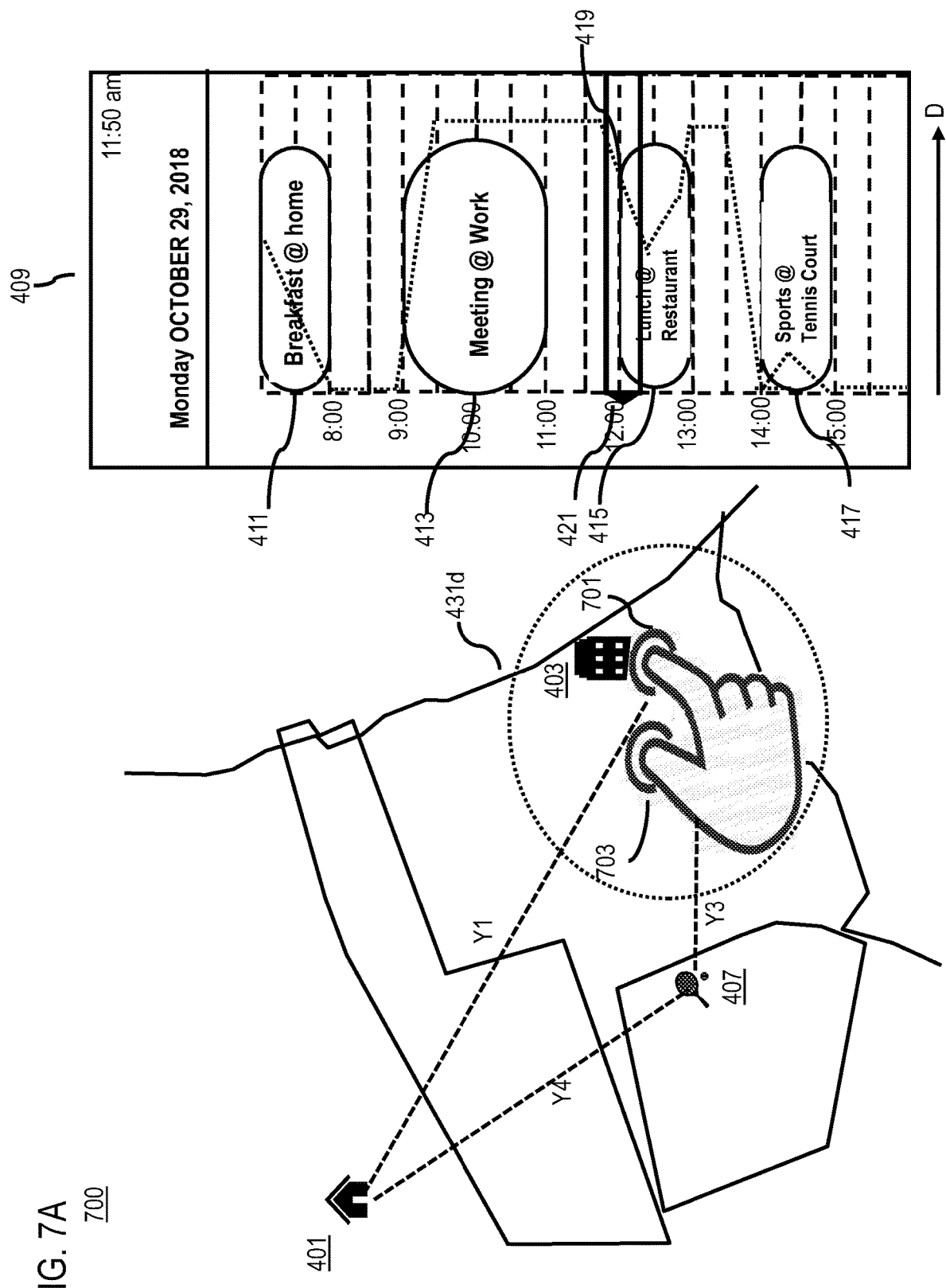
FIGS. 7A-7C are diagrams of a user interface used in processes for adjusting the proximity of the vehicle to the user on a map, according to various embodiments.
Figure 7B:
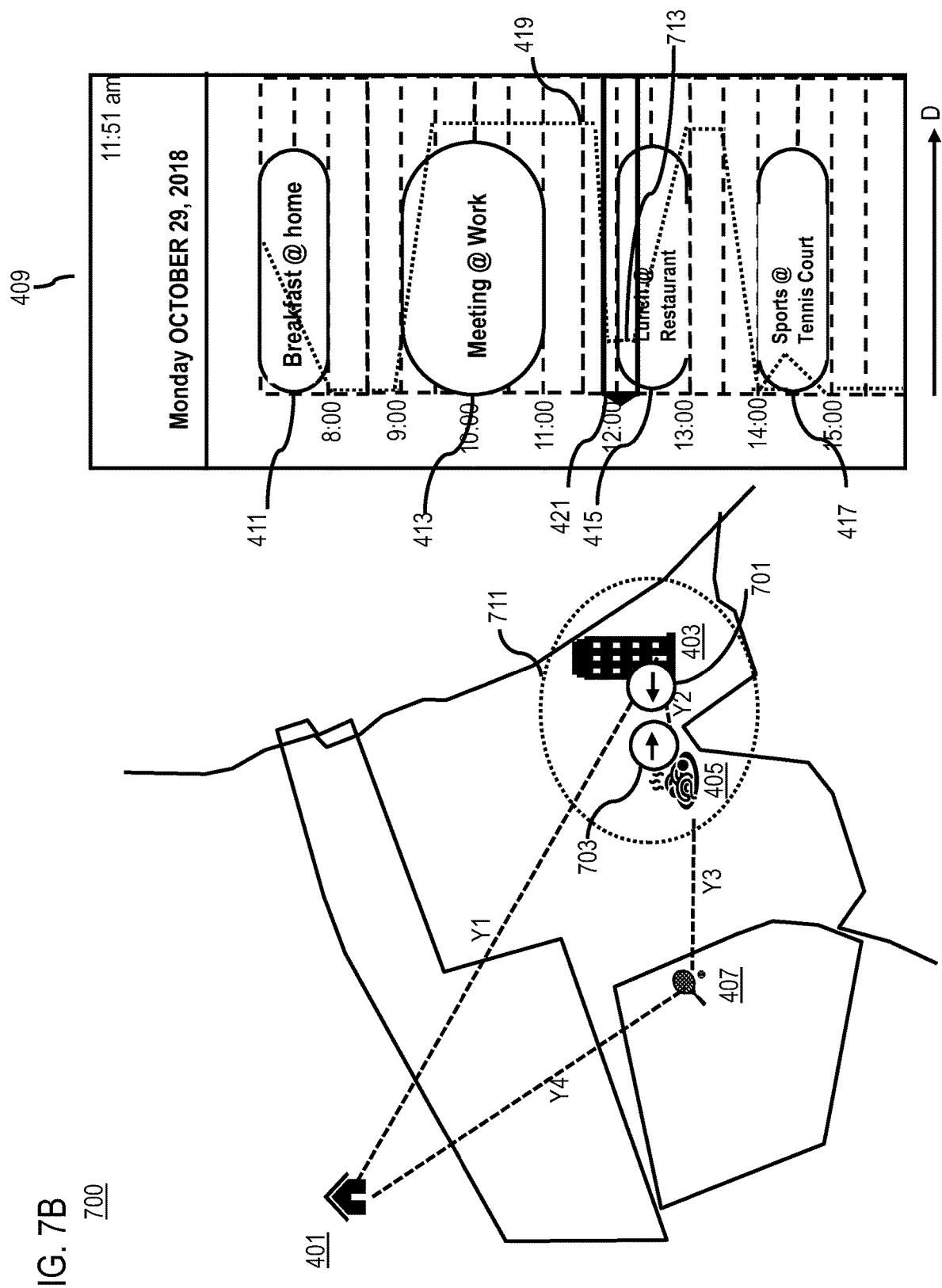
Figure 7C:
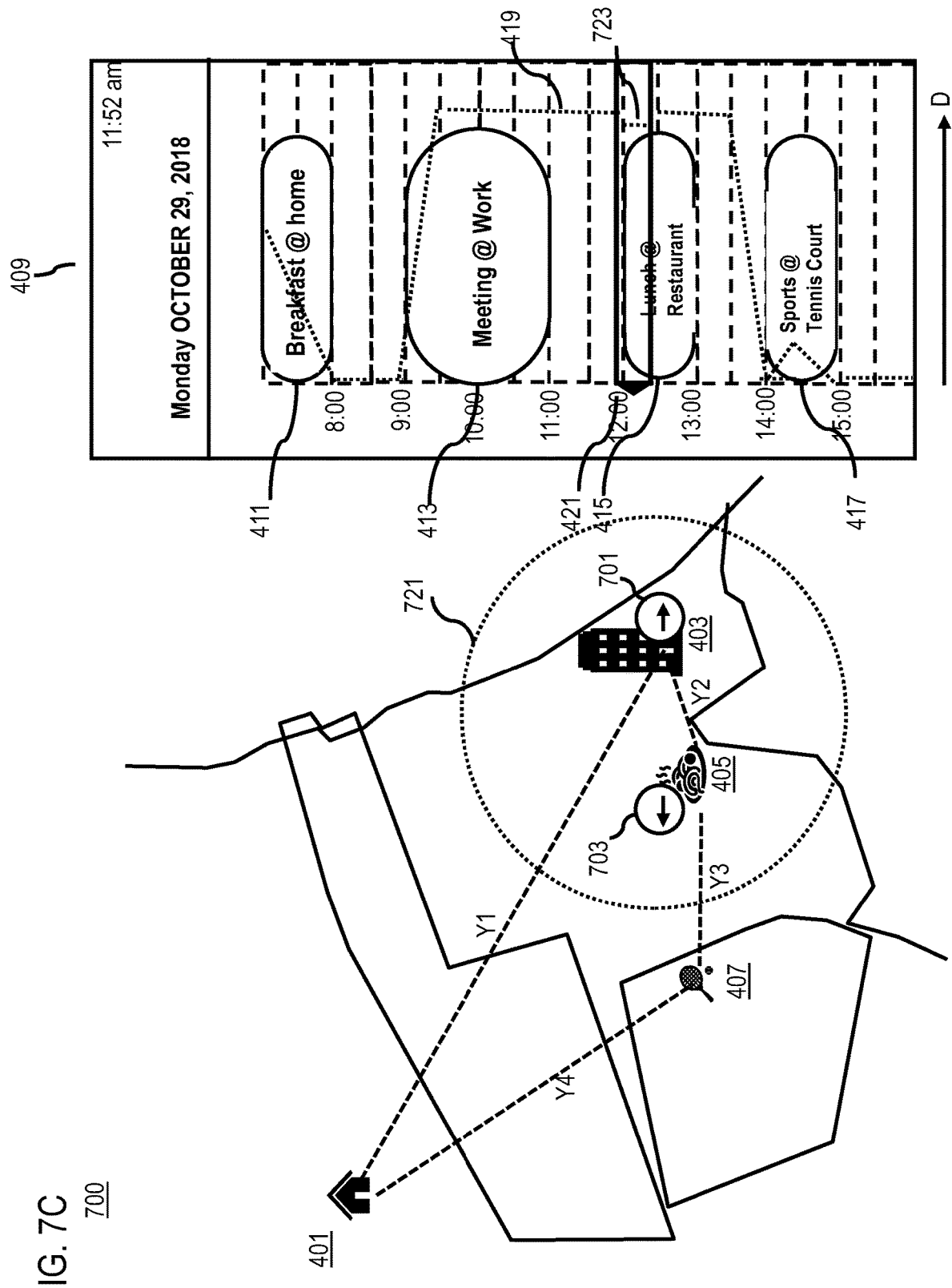

FIGS. 7A-7C are diagrams of a user interface 700 used in processes for adjusting the proximity of the vehicle to the user on a map, according to various embodiments. In one embodiment, a pair of free-travel-zone size control points 701, 703 are input at 11:50 pm in FIG. 7A (i.e., an actual time mode), when the vehicle's free travel zone is shown as the circle 431d in FIG. 4F. In another embodiment, the free-travel-zone size control points 701, 703 are input at a time point when the arrow of the slide bar 421 is moved to a time point line of 11:50 pm (i.e., a simulation mode), i.e., the end of the work meeting appointment in FIG. 7A.

By moving the free-travel-zone size control points 701, 703 closer to each other, a section 713 of the spatial-temporal mobility pattern 419 covered by the slide bar 421 is moved towards left to reduce the vehicle's free travel zone shown as the circle 431d in FIG. 4F, i.e., the 7.5-mile radius at the middle of walk from work to the restaurant, into a vehicle's free travel zone shown as a circle 711 in the map view in FIG. 7B, i.e., the 3-mile radius ("pinch zoom").

By moving the free-travel-zone size control points 701, 703 away from each other, a section 723 of the spatial-temporal mobility pattern 419 covered by the slide bar 421 is moved towards right to increase the vehicle's free travel zone shown as the circle 431d in FIG. 4F, i.e., the 7.5-mile radius at the middle of walk from work to the restaurant, into a vehicle's free travel zone shown as a circle 721 in the map view in FIG. 7C, i.e., the 9-mile radius ("expand zoom").

In one embodiment, the free-travel-zone size control points 701, 703 are moved closer to or farther away from each other via a user keyboard input, such as typing, a mouse input, a touchpad input, etc. In another embodiment, the free-travel-zone size control points 701, 703 are moved via a user touch screen input, such as single or multi-touch gestures by touching the screen with a special stylus/pen or one or more fingers. In another embodiment, the free-travel-zone size control points 701, 703 are moved via a user voice commend. For example, the user indicates that the does not need the car for lunch via speaking: "Car, you are free to drive a bit further if needed during my lunch time."

In cases of multiple users sharing one or more vehicles, the routing platform 105 considers the transportation needs of all users, their mobility patterns, and generates an aggregated spatial-temporal mobility pattern of the vehicles with respect to the users based on all user appointments. The routing platform 105 may use different colors and/or styles to code each user's appointments in one user interface shared by all the users. When the routing platform 105 updates an aggregated spatial-temporal mobility pattern for one user, the update will be shown to all the users, in order to reflect the interdependencies between the users and the vehicles. The routing platform 105 alerts the users as soon as it detects that one trip is not possible any more based on some factor changes. For example, if one family member needs to go to an emergency room, it taking the primary user to the next appointment by the vehicle may be infeasible. The routing platform 105 then recommends alternative transport modes for the primary user.

The computation of the different embodiments mentioned previously can be done partially or totally on servers/cloud, or at the edge of the network in order to balance the network load/cellular usage.

The above-discussed embodiments allow one or more users to optimize vehicle usage efficiency by allowing the users of vehicles to intuitively predict, control and adjust spatial-temporal mobility patterns of the vehicles in relation to the users' transportation needs, in addition to visualizing the vehicle positions in real time, planning tasks for the vehicles ahead, and synchronizing user appointments in the users' calendar with the vehicle tasks. Each spatial-temporal mobility pattern provides an overview of a user's day and a vehicle's proximity to the user during the day.

The above-discussed embodiments provide a user interface that allows users to control the proximity of the vehicles via manipulating the vehicle mobility patterns based on the user appointments and/or vehicle tasks.

The above-discussed embodiments provide a user interface including a calendar view, a map view, and a spatial-temporal mobility pattern of a vehicle with respect to a user based on user appointments, which visualize expected vehicle positions based on time in the map view and provide immediate user access/interventions of the vehicle's free-travel-zone, such as pinching or expanding the vehicle's free-travel-zone via user inputs.

The above-discussed embodiments automatically update/recalibrate the spatial-temporal mobility patterns in case of any appointment changes, user context changes, vehicle context changes, environmental context changes, etc.

The above-discussed embodiments real-time monitor the travel status of the user and the vehicle adjust the spatial-temporal mobility pattern considering predictive and live traffic delays.

The above-discussed embodiments enable a user to control the vehicle's proximity to the user by manipulating the spatial-temporal mobility pattern in a calendar view or a map view, while the manipulating in one view will be reflected in the other view.

The above-discussed embodiments enable new user experiences using smart routing with dynamic vehicle mobility control. The vehicle mobility control can be made simple for the user by manipulating the spatial-temporal mobility pattern.

The above-discussed embodiments combine different technologies (sensors, predictive navigation, routing algorithms, learning mobility patterns, probability computation, cost factor calculation, artificial intelligence, etc.) to provide a platform for mobility providers to share their data and get insights of spatial-temporal mobility patterns via combining many types of data sets, thereby determining user pickup locations for coming user appointments.

The processes described herein for determining and presenting a spatial-temporal mobility pattern of a vehicle with respect to a user based on user appointments may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 8:
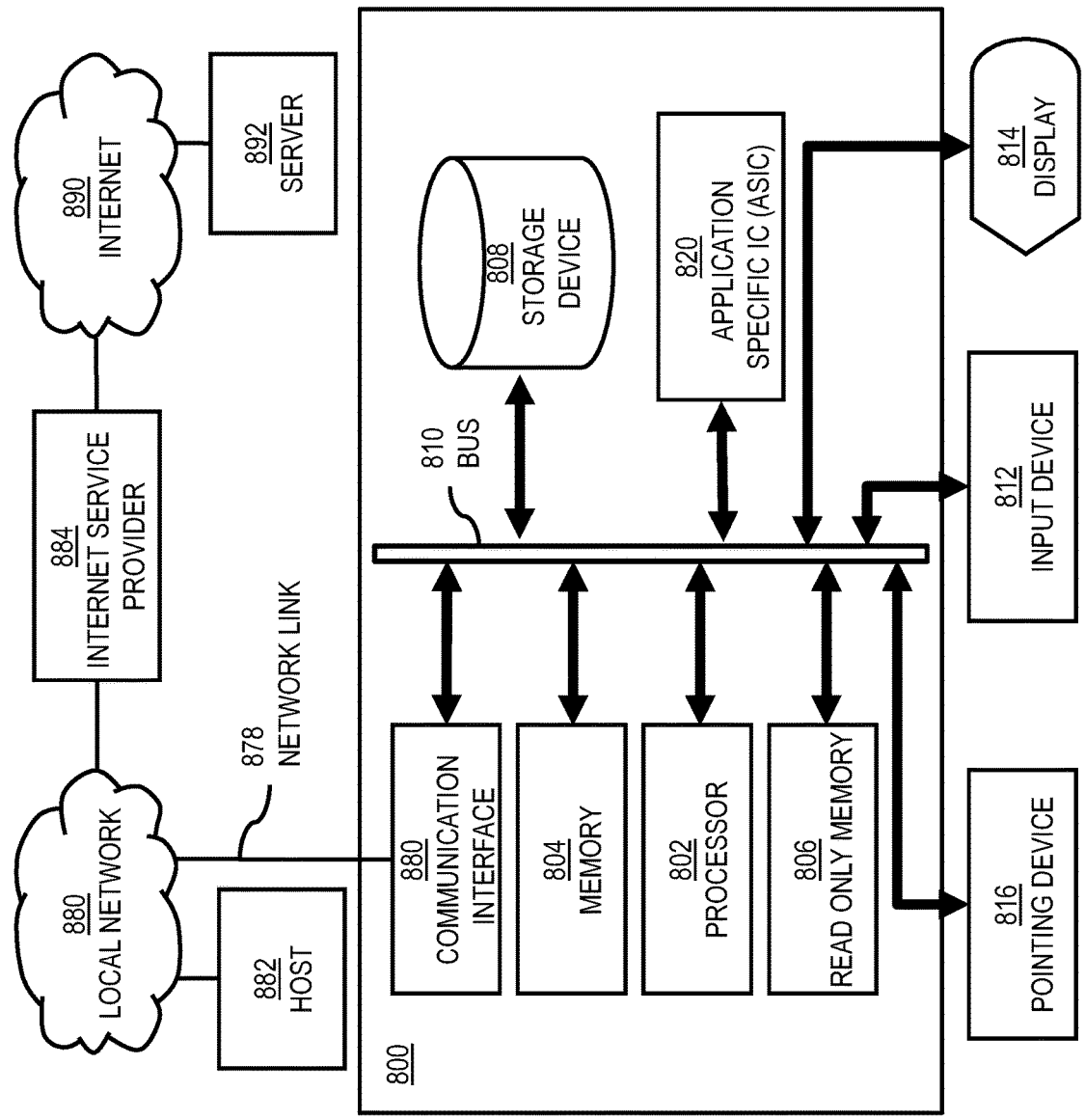
FIG. 8 is a diagram of hardware that can be used to implement an embodiment of the invention.

FIG. 8 illustrates a computer system 800 upon which an embodiment of the invention may be implemented. Although computer system 800 is depicted with respect to a particular device or equipment, it is contemplated that other devices or equipment (e.g., network elements, servers, etc.) within FIG. 8 can deploy the illustrated hardware and components of system 800. Computer system 800 is programmed (e.g., via computer program code or instructions) to provide shared vehicle availability detection based on vehicle trajectory information as described herein and includes a communication mechanism such as a bus 810 for passing information between other internal and external components of the computer system 800. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 800, or a portion thereof, constitutes a means for performing one or more steps of determining and presenting a spatial-temporal mobility pattern of a vehicle with respect to a user based on user appointments.

A bus 810 includes one or more parallel conductors of information so that information is transferred quickly among devices coupled to the bus 810. One or more processors 802 for processing information are coupled with the bus 810.

A processor (or multiple processors) 802 performs a set of operations on information as specified by computer program code related to determine and present a spatial-temporal mobility pattern of a vehicle with respect to a user based on user appointments. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 810 and placing information on the bus 810. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 802, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 800 also includes a memory 804 coupled to bus 810. The memory 804, such as a random access memory (RAM) or any other dynamic storage device, stores information including processor instructions for determining and presenting a spatial-temporal mobility pattern of a vehicle with respect to a user based on user appointments. Dynamic memory allows information stored therein to be changed by the computer system 800. RANI allows a unit of information stored at a location called a memory address to be stored and retrieved independently of information at neighboring addresses. The memory 804 is also used by the processor 802 to store temporary values during execution of processor instructions. The computer system 800 also includes a read only memory (ROM) 806 or any other static storage device coupled to the bus 810 for storing static information, including instructions, that is not changed by the computer system 800. Some memory is composed of volatile storage that loses the information stored thereon when power is lost. Also coupled to bus 810 is a non-volatile (persistent) storage device 808, such as a magnetic disk, optical disk or flash card, for storing information, including instructions, that persists even when the computer system 800 is turned off or otherwise loses power.

Information, including instructions for determining and presenting a spatial-temporal mobility pattern of a vehicle with respect to a user based on user appointments, is provided to the bus 810 for use by the processor from an external input device 812, such as a keyboard containing alphanumeric keys operated by a human user, or a sensor. A sensor detects conditions in its vicinity and transforms those detections into physical expression compatible with the measurable phenomenon used to represent information in computer system 800. Other external devices coupled to bus 810, used primarily for interacting with humans, include a display device 814, such as a cathode ray tube (CRT), a liquid crystal display (LCD), a light emitting diode (LED) display, an organic LED (OLED) display, a plasma screen, or a printer for presenting text or images, and a pointing device 816, such as a mouse, a trackball, cursor direction keys, or a motion sensor, for controlling a position of a small cursor image presented on the display 814 and issuing commands associated with graphical elements presented on the display 814. In some embodiments, for example, in embodiments in which the computer system 800 performs all functions automatically without human input, one or more of external input device 812, display device 814 and pointing device 816 is omitted.

In the illustrated embodiment, special purpose hardware, such as an application specific integrated circuit (ASIC) 820, is coupled to bus 810. The special purpose hardware is configured to perform operations not performed by processor 802 quickly enough for special purposes. Examples of ASICs include graphics accelerator cards for generating images for display 814, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 800 also includes one or more instances of a communications interface 880 coupled to bus 810. Communication interface 880 provides a one-way or two-way communication coupling to a variety of external devices that operate with their own processors, such as printers, scanners and external disks. In general the coupling is with a network link 878 that is connected to a local network 880 to which a variety of external devices with their own processors are connected. For example, communication interface 880 may be a parallel port or a serial port or a universal serial bus (USB) port on a personal computer. In some embodiments, communications interface 880 is an integrated services digital network (ISDN) card or a digital subscriber line (DSL) card or a telephone modem that provides an information communication connection to a corresponding type of telephone line. In some embodiments, a communication interface 880 is a cable modem that converts signals on bus 810 into signals for a communication connection over a coaxial cable or into optical signals for a communication connection over a fiber optic cable. As another example, communications interface 880 may be a local area network (LAN) card to provide a data communication connection to a compatible LAN, such as Ethernet. Wireless links may also be implemented. For wireless links, the communications interface 880 sends or receives or both sends and receives electrical, acoustic or electromagnetic signals, including infrared and optical signals, that carry information streams, such as digital data. For example, in wireless devices, such as mobile computers like vehicle infotainment system, the communications interface 880 includes a radio band electromagnetic transmitter and receiver called a radio transceiver. In certain embodiments, the communications interface 880 enables connection to the communication network 107 for determining and presenting a spatial-temporal mobility pattern of a vehicle with respect to a user based on user appointments to the UE 101.

The term "computer-readable medium" as used herein refers to any medium that participates in providing information to processor 802, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 808. Volatile media include, for example, dynamic memory 804. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 820.

Network link 878 typically provides information communication using transmission media through one or more networks to other devices that use or process the information. For example, network link 878 may provide a connection through local network 880 to a host computer 882 or to equipment 884 operated by an Internet Service Provider (ISP). ISP equipment 884 in turn provides data communication services through the public, world-wide packet-switching communication network of networks now commonly referred to as the Internet 890.

A computer called a server host 892 connected to the Internet hosts a process that provides a service in response to information received over the Internet. For example, server host 892 hosts a process that provides information representing video data for presentation at display 814. It is contemplated that the components of system 800 can be deployed in various configurations within other computer systems, e.g., host 882 and server 892.

At least some embodiments of the invention are related to the use of computer system 800 for implementing some or all of the techniques described herein. According to one embodiment of the invention, those techniques are performed by computer system 800 in response to processor 802 executing one or more sequences of one or more processor instructions contained in memory 804. Such instructions, also called computer instructions, software and program code, may be read into memory 804 from another computer-readable medium such as storage device 808 or network link 878. Execution of the sequences of instructions contained in memory 804 causes processor 802 to perform one or more of the method steps described herein. In alternative embodiments, hardware, such as ASIC 820, may be used in place of or in combination with software to implement the invention. Thus, embodiments of the invention are not limited to any specific combination of hardware and software, unless otherwise explicitly stated herein.

The signals transmitted over network link 878 and other networks through communications interface 880, carry information to and from computer system 800. Computer system 800 can send and receive information, including program code, through the networks 880, 890 among others, through network link 878 and communications interface 880. In an example using the Internet 890, a server host 892 transmits program code for a particular application, requested by a message sent from computer 800, through Internet 890, ISP equipment 884, local network 880 and communications interface 880. The received code may be executed by processor 802 as it is received, or may be stored in memory 804 or in storage device 808 or any other non-volatile storage for later execution, or both. In this manner, computer system 800 may obtain application program code in the form of signals on a carrier wave.

Various forms of computer readable media may be involved in carrying one or more sequence of instructions or data or both to processor 802 for execution. For example, instructions and data may initially be carried on a magnetic disk of a remote computer such as host 882. The remote computer loads the instructions and data into its dynamic memory and sends the instructions and data over a telephone line using a modem. A modem local to the computer system 800 receives the instructions and data on a telephone line and uses an infra-red transmitter to convert the instructions and data to a signal on an infra-red carrier wave serving as the network link 878. An infrared detector serving as communications interface 880 receives the instructions and data carried in the infrared signal and places information representing the instructions and data onto bus 810. Bus 810 carries the information to memory 804 from which processor 802 retrieves and executes the instructions using some of the data sent with the instructions. The instructions and data received in memory 804 may optionally be stored on storage device 808, either before or after execution by the processor 802.

FIG. 9 illustrates a chip set or chip 900 upon which an embodiment of the invention may be implemented. Chip set 900 is programmed to provide shared vehicle availability detection based on vehicle trajectory information as described herein and includes, for instance, the processor and memory components described with respect to FIG. 10 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 900 can be implemented in a single chip. It is further contemplated that in certain embodiments the chip set or chip 900 can be implemented as a single "system on a chip." It is further contemplated that in certain embodiments a separate ASIC would not be used, for example, and that all relevant functions as disclosed herein would be performed by a processor or processors. Chip set or chip 900, or a portion thereof, constitutes a means for performing one or more steps of providing user interface navigation information associated with the availability of functions. Chip set or chip 900, or a portion thereof, constitutes a means for performing one or more steps of determining and presenting a spatial-temporal mobility pattern of a vehicle with respect to a user based on user appointments.

In one embodiment, the chip set or chip 900 includes a communication mechanism such as a bus 901 for passing information among the components of the chip set 900. A processor 903 has connectivity to the bus 901 to execute instructions and process information stored in, for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, or one or more application-specific integrated circuits (ASIC) 909. A DSP 907 typically is configured to process real-world signals (e.g., sound) in real time independently of the processor 903. Similarly, an ASIC 909 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 900 includes merely one or more processors and some software and/or firmware supporting and/or relating to and/or for the one or more processors.

The processor 903 and accompanying components have connectivity to the memory 905 via the bus 901. The memory 905 includes both dynamic memory (e.g., RAM, magnetic disk, writable optical disk, etc.) and static memory (e.g., ROM, CD-ROM, etc.) for storing executable instructions that when executed perform the inventive steps described herein to provide shared vehicle availability detection based on vehicle trajectory information. The memory 905 also stores the data associated with or generated by the execution of the inventive steps.

Figure 10:
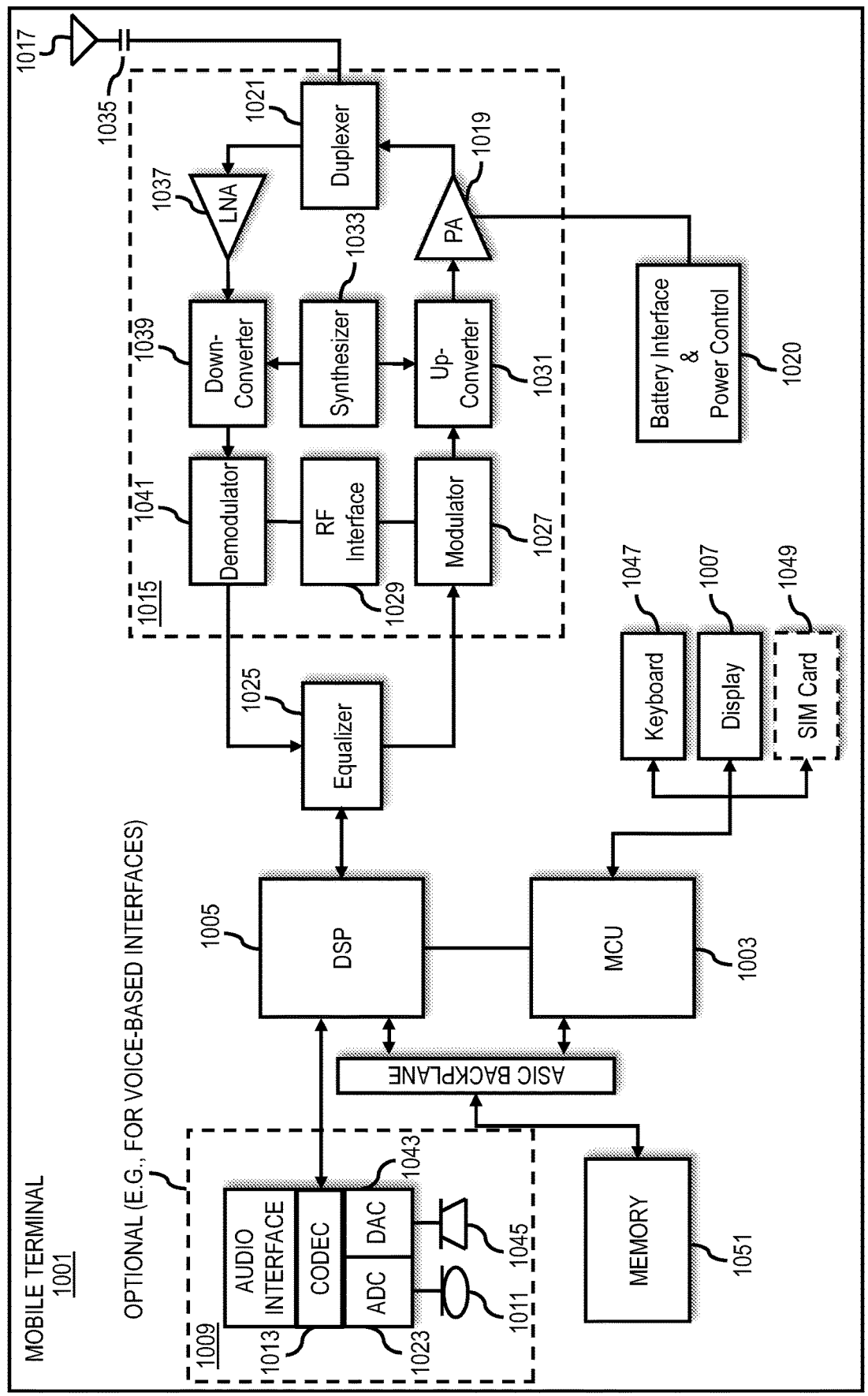
FIG. 10 is a diagram of a mobile terminal (e.g., mobile computer) that can be used to implement an embodiment of the invention.

FIG. 10 is a diagram of exemplary components of a mobile terminal (e.g., mobile computers such as vehicle infotainment system, vehicle embedded system, smartphones, etc.) for communications, which is capable of operating in the system of FIG. 1, according to one embodiment. In some embodiments, mobile terminal 1001, or a portion thereof, constitutes a means for performing one or more steps of determining and presenting a spatial-temporal mobility pattern of a vehicle with respect to a user based on user appointments. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile computer or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile computer or a similar integrated circuit in network device (e.g., a cellular network device or data other network devices).

Pertinent internal components of the mobile terminal include a Main Control Unit (MCU) 1003, a Digital Signal Processor (DSP) 1005, and a receiver/transmitter unit. In one embodiment, wherein voice-based interaction and/or communications are supported at the mobile terminal, the mobile terminal may also include a microphone gain control unit and a speaker gain control unit. A main display unit 1007 provides a display to the user in support of various applications and mobile terminal functions that perform or support the steps of determining and presenting a spatial-temporal mobility pattern of a vehicle with respect to a user based on user appointments. The display 1007 includes display circuitry configured to display at least a portion of a user interface of the mobile terminal (e.g., mobile telephone). Additionally, the display 1007 and display circuitry are configured to facilitate user control of at least some functions of the mobile terminal. In embodiments supporting voice-based interactions and/or communications, an audio function circuitry 1009 includes a microphone 1011 and microphone amplifier that amplifies the speech signal output from the microphone 1011. The amplified speech signal output from the microphone 1011 is fed to a coder/decoder (CODEC) 1013.

A radio section 1015 amplifies power and converts frequency in order to communicate with a base station (e.g., data and/or voice communications), which is included in a mobile communication system, via antenna 1017. The power amplifier (PA) 1019 and the transmitter/modulation circuitry are operationally responsive to the MCU 1003, with an output from the PA 1019 coupled to the duplexer 1021 or circulator or antenna switch, as known in the art. The PA 1019 also couples to a battery interface and power control unit 1020.

In use, data to support determining and presenting a spatial-temporal mobility pattern of a vehicle with respect to a user based on user appointments is formatted into network packets (e.g., Internet Protocol (IP) packets) for transmission using one or more network transmission protocol (e.g., a cellular network transmission protocol described in more detail below). In one embodiment, the network packets include control information and payload data, with the control information specifying originating/destination network addresses, error control signals, signals for reconstructing the user data from the packets, and/or other related information. In embodiments supporting voice-based interaction and/or communications, a user of mobile terminal 1001 speaks into the microphone 1011 and his or her voice along with any detected background noise is converted into an analog voltage. The analog voltage is then converted into a digital signal through the Analog to Digital Converter (ADC) 1023. The control unit 1003 routes the digital signal into the DSP 1005 for processing therein, such as speech recognition, speech encoding, channel encoding, encrypting, and interleaving.

In one embodiment, the processed network packets and/or voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1025 for compensation of any frequency-dependent impairments that occur during transmission through the air such as phase and amplitude distortion. After equalizing the bit stream, the modulator 1027 combines the signal with a RF signal generated in the RF interface 1029. The modulator 1027 generates a sine wave by way of frequency or phase modulation. In order to prepare the signal for transmission, an up-converter 1031 combines the sine wave output from the modulator 1027 with another sine wave generated by a synthesizer 1033 to achieve the desired frequency of transmission. The signal is then sent through a PA 1019 to increase the signal to an appropriate power level. In practical systems, the PA 1019 acts as a variable gain amplifier whose gain is controlled by the DSP 1005 from information received from a network base station. The signal is then filtered within the duplexer 1021 and optionally sent to an antenna coupler 1035 to match impedances to provide maximum power transfer. Finally, the signal is transmitted via antenna 1017 to a local base station. An automatic gain control (AGC) can be supplied to control the gain of the final stages of the receiver. The local base station or similar component then forwards data or network packets to a gateway server (e.g., a gateway to the Internet) for connectivity to network components used for providing shared vehicle availability detection. In embodiments supporting voice-based interactions and/or communications, voice signals may be forwarded from the local base station to a remote terminal which may be another mobile computer, cellular telephone, and/or any other mobile phone or a land-line connected to a Public Switched Telephone Network (PSTN), or other telephony networks.

Voice signals transmitted to the mobile terminal 1001 are received via antenna 1017 and immediately amplified by a low noise amplifier (LNA) 1037. A down-converter 1039 lowers the carrier frequency while the demodulator 1041 strips away the RF leaving only a digital bit stream. The signal then goes through the equalizer 1025 and is processed by the DSP 1005. A Digital to Analog Converter (DAC) 1043 converts the signal and the resulting output is transmitted to the user through the speaker 1045, all under control of a Main Control Unit (MCU) 1003 which can be implemented as a Central Processing Unit (CPU) (not shown).

The MCU 1003 receives various signals including input signals from the keyboard 1047. The keyboard 1047 and/or the MCU 1003 in combination with other user input components (e.g., the microphone 1011) comprise a user interface circuitry for managing user input. The MCU 1003 runs a user interface software to facilitate user control of at least some functions of the mobile terminal 1001 to provide shared vehicle availability detection based on vehicle trajectory information. The MCU 1003 also delivers a display command and a switch command to the display 1007 and to the speech output switching controller, respectively. Further, the MCU 1003 exchanges information with the DSP 1005 and can access an optionally incorporated SIM card 1049 and a memory 1051. In addition, the MCU 1003 executes various control functions required of the terminal. The DSP 1005 may, depending upon the implementation, perform any of a variety of conventional digital processing functions on the voice signals. Additionally, DSP 1005 determines the background noise level of the local environment from the signals detected by microphone 1011 and sets the gain of microphone 1011 to a level selected to compensate for the natural tendency of the user of the mobile terminal 1001.

The CODEC 1013 includes the ADC 1023 and DAC 1043. The memory 1051 stores various data including call incoming tone data and is capable of storing other data including music data received via, e.g., the global Internet. The software module could reside in RAM memory, flash memory, registers, or any other form of writable storage medium known in the art. The memory device 1051 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1049 carries, for instance, important information, such as the cellular phone number, the carrier supplying service, subscription details (e.g., data and/or voice subscriptions), and security information. The SIM card 1049 serves primarily to identify the mobile terminal 1001 on a radio network. The card 1049 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A computer-implemented method comprising:
identifying, by one or more processors, a user of a vehicle, one or more appointments of the user, or a combination thereof;
determining, by the one or more processors, a spatial-temporal mobility pattern of the vehicle with respect to a spatial-temporal proximity limit of the vehicle to the user based on one or more locations, one or more scheduling times, one or more contexts, or a combination thereof of the one or more appointments;
causing, by the one or more processors, one or more displays to display the spatial-temporal mobility pattern; and
in response to manipulation of the spatial-temporal mobility pattern on the one or more displays by the user, executing, by the one or more processors, control over the spatial-temporal proximity limit of the vehicle to the user based on the manipulated spatial-temporal mobility pattern.

2. The method of claim 1, wherein the spatial-temporal proximity limit is displayed as a spatial boundary free for the vehicle to travel with respect to a location of a respective one of the one or more appointments.

3. The method of claim 2, wherein the spatial-temporal mobility pattern is displayed in a calendar-based view depicting one or more calendar entries of the one or more appointments, a map-based view depicting the one or more locations of the one or more appointments, or a combination thereof.

4. The method of claim 3, further comprising:
detecting via a sensor or receiving an input specifying an update to the one or more appointments; and
modifying the spatial-temporal mobility pattern based on the update.

5. The method of claim 4, wherein the update includes adding a new appointment, deleting one of the one or more appointments, a change to the one or more locations, the one or more scheduling times, and the one or more contexts, or a combination thereof of the one or more appointments, or a combination thereof.

6. The method of claim 4, further comprising:
generating a subsequent presentation of the spatial-temporal mobility pattern as modified in the calendar-based view, the map-based view, or a combination thereof.

7. The method of claim 6, further comprising:
highlighting one or more differences between the presentation and the subsequent presentation in the calendar-based view, the map-based view, or a combination thereof.

8. The method of claim 3, wherein the spatial-temporal mobility pattern includes the calendar-based view and the map-based view in one user interface, and the method further comprises:
detecting via a sensor or receiving an input specifying one of the one or more appointments in the calendar-based view; and
causing at least one of the one or more displays to display the spatial boundary free for the vehicle to travel corresponding to the specified one of the one or more appointments.

9. The method of claim 8, further comprising:
presenting an update to the one or more appointments entered via one of the calendar-based view and the map-based view unto the other one of the calendar-based view and the map-based view.

10. The method of claim 1, further comprising:
parsing the one or more appointments from one or more online data sources, one or more offline data sources, or a combination thereof associated with the user.

11. An apparatus comprising:
at least one processor; and
at least one memory including computer program code for one or more programs,
the at least one memory and the computer program code configured to, with the at least one processor, cause the apparatus to perform at least the following,
identify a user of a vehicle, one or more appointments of the user, or a combination thereof;
determine a spatial-temporal mobility pattern of the vehicle with respect to a spatial-temporal proximity limit of the vehicle to the user based on one or more locations, one or more scheduling times, one or more contexts, or a combination thereof of the one or more appointments;
cause one or more displays to display the spatial-temporal mobility pattern; and
in response to manipulation of the spatial-temporal mobility pattern on the one or more displays by the user, execute control over the spatial-temporal proximity limit of the vehicle to the user based on the manipulated spatial-temporal mobility pattern.

12. An apparatus of claim 11, wherein the spatial-temporal proximity limit is displayed as a spatial boundary free for the vehicle to travel with respect to a location of a respective one of the one or more appointments.

13. An apparatus of claim 12, wherein the spatial-temporal mobility pattern is displayed in a calendar-based view depicting one or more calendar entries of the one or more appointments, a map-based view depicting the one or more locations of the one or more appointments, or a combination thereof.

14. An apparatus of claim 13, wherein the apparatus is further caused to:
detect via a sensor or receiving an input specifying an update to the one or more appointments; and
modify the spatial-temporal mobility pattern based on the update.

15. An apparatus of claim 14, wherein the update includes adding a new appointment, deleting one of the one or more appointments, a change to the one or more locations, the one or more scheduling times, and the one or more contexts, or a combination thereof of the one or more appointments, or a combination thereof.

16. An apparatus of claim 14, wherein the apparatus is further caused to:
generate a subsequent presentation of the spatial-temporal mobility pattern as modified in the calendar-based view, the map-based view, or a combination thereof.

17. An apparatus of claim 16, wherein the apparatus is further caused to:
highlight one or more differences between the presentation and the subsequent presentation in the calendar-based view, the map-based view, or a combination thereof.

18. A non-transitory computer-readable storage medium carrying one or more sequences of one or more instructions which, when executed by one or more processors, cause an apparatus to at least perform the following steps:
- identifying a user of a vehicle, one or more appointments of the user, or a combination thereof;
- determining a spatial-temporal mobility pattern of the vehicle with respect to a spatial-temporal proximity limit of the vehicle to the user based on one or more locations, one or more scheduling times, one or more contexts, or a combination thereof of the one or more appointments;
- causing one or more displays to display the spatial-temporal mobility pattern; and
- in response to manipulation of the spatial-temporal mobility pattern on the one or more displays by the user, executing control over the spatial-temporal proximity limit of the vehicle to the user based on the manipulated spatial-temporal mobility pattern.

19. A non-transitory computer-readable storage medium of claim 18, wherein the spatial-temporal proximity limit is displayed as a spatial boundary free for the vehicle to travel with respect to a location of a respective one of the one or more appointments.

20. A non-transitory computer-readable storage medium of claim 19, wherein the spatial-temporal mobility pattern is displayed in a calendar-based view depicting one or more calendar entries of the one or more appointments, a map-based view depicting the one or more locations of the one or more appointments, or a combination thereof.

* * * * *